(12) United States Patent
Mazur et al.

(10) Patent No.: US 8,989,544 B2
(45) Date of Patent: Mar. 24, 2015

(54) ALL-OPTICAL LOGIC GATES AND METHODS FOR THEIR FABRICATION

(75) Inventors: Eric Mazur, Concord, MA (US); Rafael R. Gattass, Silver Spring, MD (US); Geoffry T. Svacha, Somerville, MA (US); Katherine C. F. Phillips, Cambridge, MA (US); Christopher C. Evans, Cambridge, MA (US)

(73) Assignee: President & Fellows of Harvard College, Cambridge, MA (US)

(*) Notice: Subject to any disclaimer, the term of this patent is extended or adjusted under 35 U.S.C. 154(b) by 791 days.

(21) Appl. No.: 13/143,451

(22) PCT Filed: Jan. 8, 2010

(86) PCT No.: PCT/US2010/020522
§ 371 (c)(1),
(2), (4) Date: Nov. 1, 2011

(87) PCT Pub. No.: WO2010/081019
PCT Pub. Date: Jul. 15, 2010

(65) Prior Publication Data
US 2012/0039560 A1    Feb. 16, 2012

Related U.S. Application Data

(60) Provisional application No. 61/143,190, filed on Jan. 8, 2009.

(51) Int. Cl.
| | | |
|---|---|---|
| *G02B 6/00* | (2006.01) | |
| *G02F 3/00* | (2006.01) | |
| *G02F 1/365* | (2006.01) | |
| *G02B 6/12* | (2006.01) | |
| *G02F 3/02* | (2006.01) | |
| *G02F 1/35* | (2006.01) | |

(52) U.S. Cl.
CPC ............ *G02B 6/12007* (2013.01); *G02F 3/024* (2013.01); *G02F 1/3519* (2013.01); *G02F 3/00* (2013.01); *G02F 2203/15* (2013.01)
USPC ........................................... 385/122; 359/108

(58) Field of Classification Search
CPC ...... G02F 3/024; G02F 1/3517; G02F 1/3519
USPC ........................................... 385/122; 359/108
See application file for complete search history.

(56) References Cited

PUBLICATIONS

Jahn, et al., "Monolithically integrated nonlinear Sagnac interferometer and its application as a 20 Gbit/s all-optical demultiplexer", OSA/Integrated Photonic Research Topical Meeting, Boston, MA, pp. 372-375, Apr. 29-May 2, 1996.
Foster, et al., Supercontiuum generation and pulse compression in subwavelength-sized waveguides, Conference on Lasers & Electro-Optics (CLEO), Baltimore, MD, pp. 1261-1263, May 23-27, 2006.
(Continued)

*Primary Examiner* — Jerry Rahll
(74) *Attorney, Agent, or Firm* — Thomas Engellenner; Reza Mollaaghababa; Pepper Hamilton LLP

(57) ABSTRACT

The present invention provides optical devices that employ nonlinear optical effects for processing optical signals. For example, such an optical device can include a nano-sized interferometric component that provides an optical output signal via interference of two input signals subsequent to their asymmetric nonlinear phase accumulation. The interferometric element can have a variety of configurations, such as Sagnac, Mach-Zehnder or Michelson configurations.

36 Claims, 22 Drawing Sheets

(56) References Cited

PUBLICATIONS

Van, et al., "All-optical nonlinear switching in GaAs—AlGaAs micoring Resonators," IEEE Photonics Technology Letters, vol. 14, No. 1, pp. 74-76, Jan. 2002.

Ibrahim, et al., "All-optical AND/NAND logic gates using semiconductor microresonators," IEEE Photonics Technology Letters, vol. 15, No. 10, pp. 1422-1424, Oct. 2003.

International Preliminary Report on Patentability for PCT/US2010/020522 dated Jul. 12, 2011.

Blow, K.J., et al., "Experimental demonstration of optical soliton switching in an all-fiber nonlinear Sagnac interferometer," Optics Letters, vol. 14, No. 14, 754-756, Jul. 15, 1989.

Foster, M.A., et al., "Optimal waveguide dimensions for nonlinear interactions," Optics Express, vol. 12, No. 13, 2880-2887, Jun. 28, 2004.

Grant, R.S., et al. "Observations of ultrafast nonlinear refraction in an InGaAsP optical amplifier," Appl. Phys. Lett. 58 (11), 1110-1121, Mar. 18, 1991.

Jinno M. and Matsumoto, T., "Nonlinear Sagnac Interferometer Switch and Its Applications," IEEE Journal of Quantum Electronics, vol. 28, No. 4, 875-882, Apr. 1992.

Long, H., et al., "Third-order optical nonlinearities in anatase and rutile $TiO_2$ Thin Films," Elsevier B.V., Thin Solid Films 517 (2009) 5601-5604.

Stegeman G.I., et al., "Third Order Nonlinear Integrated Optics," Journal of Lightwave Technology, vol. 6, No. 6, 953-970, Jun. 1988.

Yeatman, E.M., et al., "Optical Gain in Er-doped $SiO_2$—$TiO_2$ waveguides fabricated by the sol-gel technique," Optics Communications 164 (1999) 19-25.

ALL-OPTICAL LOGIC GATES AND METHODS FOR THEIR FABRICATION

RELATED APPLICATION

The present application claims priority to a provisional application entitled "All-Optical Logic Gates and Methods for Their Fabrication," filed on Jan. 8, 2009 and having a Ser. No. 61/143,190. This provisional application is herein incorporated by reference in its entirety.

GOVERNMENT SPONSORED FUNDING

This invention is funded by the National Science Foundation, Grant No. NSF ECS-0601520. The Government has certain rights in this invention.

BACKGROUND

The present invention generally relates to optical signal processing, and more particularly to interferometric systems that provide a logic response to a set of input signals.

There has been a rapid increase in volume of information transmitted by telecommunications networks in the last decade. Optical technology has replaced most of the electrical long-distance transmission lines, yet at nodes where information is switched and rerouted, electrical technology is still dominant. The replacement of the relatively slow electrical technology with optical components, such as optical switching components, is seen as the next challenge to overcome in order to increase bandwidth and speed. The dynamic nature of future optical networks requires high levels of integration, fast response time, and adaptability of such optical components.

Moreover, there is a need for optical switching and logic components in other applications, such as optical computing.

Hence, there is a need for enhanced optical components for optical signal processing, e.g., for enhanced optical logic gates.

SUMMARY

In one aspect, the present invention provides an optical device having an optical logic gate with one or more input ports and at least one output port. The optical logic gate can further include an interferometric component that utilizes a non-linear phase accumulation of one or more input optical signals to generate an output signal indicative of a logic functionality based on the input signal(s).

In some embodiments, the logic gate can include a plurality of nano-sized (or in some cases micro-sized) structures that are capable of guiding the optical signal(s). For example, the logic gate can include one or more optical waveguides providing the input port(s), and an optical interferometric structure, e.g., a loop, that is in optical coupling with those waveguide(s). An output optical waveguide that is in optical coupling with the interferometric structure can receive an output optical signal from the loop.

In some embodiments, one or more of the nano-sized or the micro-sized structures are formed of $TiO_2$, e.g., on an underlying substrate, such as $SiO_2$ or silicon.

In one aspect, an optical device is provided that includes one or more input ports for receiving one or more input optical signals. The optical device can also include an interferometric component in optical coupling with at least one of said input ports to receive at least one signal based on said input signals and to generate at least two intermediate signals from the received signal. The interferometric component can have one or more nano-sized waveguides formed of a material exhibiting nonlinearity for providing propagation paths for the at least two intermediate signals such that the intermediate signals accumulate phase asymmetrically upon propagation through the one or more nano-sized waveguides. The interferometric component can also be configured to generate an output signal based on interference of the intermediate signals subsequent to their asymmetric phase accumulation. The optical device can further include an output port in optical coupling with said interferometer to receive said output signal. The output signal can exit the device via the output port, e.g., to be applied to another device as an input signal.

In some embodiments, the nano-sized waveguides can be substantially transparent to radiation having wavelengths in a range of about 400 nm to about 1000 nm and/or in a range of about 400 nm to about 850 nm. By way of example, the nano-sized waveguides can be formed of any of $TiO_2$, CdS, CuCl, SiC, GaP, $SrTiO_3$ and ZnTe, and/or a material exhibiting a third order nonlinear susceptibility ($\chi^3$) greater than about $10^{-14}$ $cm^2/W$.

In some embodiments, the interferometric component can have a Sagnac configuration having a waveguide loop, which can have an input port and an output port that are evanescently coupled to split the received signal into a clockwise (CW) propagating signal and a counterclockwise (CCW) propagating signal corresponding to the intermediate signals. At least one of said counter-propagating signals accumulates phase non-linearly, e.g., as a result of self phase or cross phase modulation. In some cases, the evanescent coupling can be characterized by a coupling coefficient less than about 0.5 and, in some cases, by a coupling coefficient in a range of about 0.3 to about 0.5. The waveguide loop can have a width less than about 500 nm and in some embodiments it can have a width in a range of about 100 nm to about 500 nm.

In some exemplary embodiments, the interferometric component can have a Mach-Zehnder interferometric configuration and the aforementioned one or more nano-sized waveguides can comprise two waveguide branches of said Mach-Zehnder interferometric configuration. The two waveguide branches can be coupled at an input junction configured to split the received signal into the at least two intermediate signals and can be coupled at an output junction for combining the intermediate signals subsequent to their asymmetric phase accumulation to generate the output signal.

In other exemplary embodiments, the interferometric component can have a Michelson interferometric configuration and the one or more nano-sized waveguides can comprise the two branches of the Michelson configuration.

In some embodiments, the optical device can further include any of a loss, a gain, a dispersive mechanism or a control signal coupled to at least one of said one or more nano-sized waveguides so as to facilitate the asymmetric phase accumulation of the optical signals. The loss mechanism can include a cladding layer disposed over a selected portion of at least one of the one or more nano-sized waveguides and/or a light scattering mechanism.

In some embodiments, the optical device can further include an optical gain mechanism coupled to at least one of the one or more nano-sized waveguides for providing an optical gain profile exhibiting an asymmetric optical gain for at least one wavelength corresponding to a wavelength of at least one of said intermediate signals. By way of example, the optical gain mechanism can include a gain medium disposed in the nano-sized waveguide, and an optical source for generating carrier excitation in the gain medium (optical pumping). The optical source can be optically coupled to nano-sized waveguide, e.g., via evanescent coupling, to deliver the pump radiation (continuous-wave or pulsed) to the gain medium, where the pump radiation has a wavelength suitable for absorption by said gain medium. In some cases, the gain medium can be uniformly distributed in the nano-sized waveguide and the pump radiation can asymmetrically excite the gain medium as it propagates along the waveguide. Alternatively, the gain medium can be localized within a portion of the waveguide.

In some embodiments, the optical device can further include a semiconductor substrate on which the interferometric components are disposed. In some cases, the device can also include an insulating layer (e.g., for optical and/or electrical isolation) separating the interferometer component from the substrate. In one embodiment, the substrate can comprise a silicon substrate and the insulating layer can comprise a silicon oxide ($SiO_2$) layer. In some embodiments, a top cladding layer (e.g., $SiO_2$) can be disposed, e.g., deposited, over the interferometric components and/or other elements to provide, e.g., mechanical stability and resistance to environmental factors such as dust. By way of example, such top cladding layer can be deposited using chemical vapor deposition, plasma enhanced chemical vapor deposition, sputtering, atomic layer deposition, electron beam evaporation, etc.

In another aspect, an optical circuit is provided that includes at least one input port for receiving one or more optical input signals and an output port. The optical circuit also includes an optical interferometer optically coupled to said at least one input port to receive an optical entry signal based on the one or more optical input signals and to generate at least two intermediate signals based on said entry signal. The interferometer can have at least one nano-sized interferometric element configured to cause at least one of said intermediate signals to accumulate phase nonlinearly and to generate an output signal based on interference of the intermediate signals subsequent to said non-linear phase accumulation. The output signal can exhibit a peak intensity that is a function of peak intensities of said input signals.

In some embodiments, in the above optical circuit, the nano-sized interferometric element can be substantially transparent to radiation having wavelengths in a range of about 400 nm to about 1000 nm and/or in a range of about 400 nm to about 850 nm, or in a range of about 500 nm to about 850 nm. In some cases, the interferometric element can be formed of a material exhibiting a third order nonlinear susceptibility ($\chi^3$) greater than about $10^{-14}$ $cm^2/W$. In some cases, the interferometric element can be formed of any of $TiO_2$, CdS, CuCl, SiC, GaP, $SrTiO_3$ and ZnTe. The interferometer can be configured such that the output signal exhibits a peak intensity greater than a predefined level when the peak intensity of at least one of said input signals exceeds a predefined threshold. Alternatively, the interferometer can be configured such that said output signal exhibits a peak intensity less than a predefined level when the peak intensity of at least one of said input signals is less than a predefined threshold. In some cases, the interferometer can be configured such that the output signal exhibits a peak intensity greater than a predefined threshold when the peak intensity of all of said input signals is less than a predefined threshold. In some cases, the interferometer is configured such that the output signal exhibits a peak intensity greater than a predefined level when the peak intensities of all input signals exceed a predefined threshold. The interferometer can be configured such that said output signal exhibits a peak intensity greater than a predefined level when the peak intensity of only one of said input signals exceeds a predefined threshold. The interferometer can have, without limitation, any of a Sagnac, Mach-Zehnder or Michelson configuration.

In yet another aspect, an optical logic circuit is provided that includes at least one input port (e.g., two input ports) and an output port, where the at least one input port is configured to receive at least one optical input signal representing one or more input logic signals. The logic circuit can further include an interferometric component having one or more nano-sized optical waveguides in optical coupling with the at least one input port. The interferometric component can generate an output optical signal representing a Boolean logic applied to the one ore more input logic signals by interference of at least two intermediate optical signals derived from the one ore more input optical signals. The interferometric component can be configured such that the intermediate optical signals undergo asymmetric non-linear phase accumulation prior to said interference. By way of example, the Boolean logic can include any of a NAND, AND, OR, XOR, NOR, XNOR, or NOT logic applied to said input logic signals. In some cases, one input port can be used to receive a control signal and another port can be employed to receive an input optical signal on which a logic operation (e.g., NOT logic operation) is performed.

In some embodiments, the one or more nano-sized waveguides can be formed of a material substantially transparent to radiation having wavelengths in a range of about 400 nm to about 1000 nm. In some embodiments, the nano-sized waveguides of the interferometric component can be formed of any of $TiO_2$, CdS, CuCl, SiC, GaP, $SrTiO_3$ and ZnTe. The interferometric component can have, without limitation, any of a Sagnac, a Mach-Zehnder or a Michelson configuration. At least one of the input logic signals can comprise an optical pulse having a pulse duration equal to or less than about 1 picosecond, e.g., in a range of about 50 femtoseconds to about 500 femtoseconds or in a range of about 100 femtoseconds to about 500 femtoseconds. In some cases, the pulses can have an energy in a range of about 1 pJ to about 10 nJ. In one embodiment, at least one of the input logic signals can have a central wavelength in a range of about 400 nm to about 1.6 microns, or in a range of about 400 nm to about 1 micron.

In a further aspect, an optical switch is provided, which comprises a nano-sized optical resonating element formed of a material exhibiting non-linearity, where the resonating element exhibits one or more resonant modes whose frequencies depend on intensity of radiation coupled to said resonating element. The optical switch further includes at least one waveguide evanescently coupled to the resonating element and having an input port for receiving at least one input signal and at least a control signal, said waveguide having an output port, wherein a coupling of the control signal to the resonating element via said at least one waveguide causes a shift in frequency of one or more resonant modes of said optical resonating element so as to modulate coupling of said input signal to said resonating element.

In a related aspect, an optical switch is provided that includes a nano-sized optical resonating element formed of a material exhibiting non-linearity, where the resonating element exhibits one or more resonant modes whose frequencies depend on intensity of radiation coupled to the resonating element. The switch can also include a first waveguide evanescently coupled to the resonating element and having an input port for receiving an input signal and an output port. The switch can further include a second waveguide evanescently coupled to the resonating element, where the second waveguide provides a propagation path for a control signal. The coupling of the control signal to the resonating element can cause a shift in frequency of one or more resonant modes of said optical resonating element so as to modulate coupling of said input signal to said resonating element.

In some embodiments, the coupling of the control signal to the resonating element enhances coupling of the input signal to the resonating element, thereby generating an off state of the switch. In some other embodiments, the coupling of the control signal to the resonating element reduces coupling of the input signal to the resonating element, thereby generating an on-state of the switch.

The control signal can have a greater intensity than the input signal and, in some embodiments, a ratio of an intensity of said control signal relative to said input signal is at least about 2. In some embodiments, the optical resonating element can be formed of a material that is substantially transparent to radiation having wavelengths in a range of about 400 nm to about 1550 nm and, in some embodiments, in a range of about 400 nm to about 1000 nm, or in a range of about 400 nm to about 850 nm, or in a range of about 400 nm to about 800 nm, or in a range of about 500 nm to about 1000 nm, or in a range of about 500 nm to about 850 nm, or in a range of about 500 nm to about 800 nm. By way of example, the optical resonating element can be formed of any of $TiO_2$, CdS, CuCl, SiC, GaP, $SrTiO_3$ and ZnTe and can comprise, e.g., any of a ring resonator or a disk resonator.

In some embodiments, the material exhibiting non-linearity has a third order nonlinear susceptibility ($\chi^3$) greater than about $10^{-14}$ cm$^2$/W. A wavelength of the control signal can be different than a wavelength of the input signal. For example, the wavelengths of the control and input signals can be separated by at least about 10 nm, or at least about 20 nm, or at least about 100 nm, or at least about 500 nm.

In still a further aspect, an optical logic circuit is provided that includes a nano-sized optical resonating element formed of a material exhibiting non-linearity, where the resonating element exhibits one or more resonant modes whose frequencies depend on intensity of radiation coupled to said resonating element. At least one waveguide is evanescently coupled to the resonating element, where waveguide has at least one input port for receiving at least one input signal and an output port. The at least one input signal evanescently couples to the resonating element with a coupling coefficient that varies as a function of an intensity of said at least one input signal.

In a related aspect, an optical logic circuit is provided that includes a nano-sized optical resonating element formed of a material exhibiting non-linearity, where the resonating element exhibits one or more resonant modes whose frequencies depend on the intensity of radiation coupled to the resonating element. The logic circuit can also include a first waveguide evanescently coupled to said resonating element, said first wave guide having a first input port for receiving a first input signal and further having an output port. A second waveguide having a second input port for receiving a second input signal is optically coupled to the first waveguide so as to couple the second input signal to the first input signal, thereby generating a resultant input signal propagating along said first waveguide. The resultant input signal can evanescently couple to said resonating element with a coupling coefficient that varies as a function of an intensity of said resultant input signal.

In some embodiments, the coupling coefficient can be sufficiently small when an intensity of the resultant input signal is below a selected threshold so as to allow the resultant input signal to propagate to said output port. The coupling coefficient can be sufficiently large when an intensity of the resultant input signal is greater than a selected threshold to inhibit the passage of the resultant input signal to the output port. The first and second waveguides can be evanescently coupled. In some embodiments, the optical resonating element can be substantially transparent to radiation having wavelengths in a range of about 400 nm to about 1550 nm, for example, in a range of about 400 nm to about 1000 nm, or in a range of about 400 nm to about 850 nm, or in a range of about 500 nm to about 1000 nm, or in a range of about 500 nm to about 850 nm. The optical resonating element can be formed, without limitation, of any of $TiO_2$, CdS, CuCl, SiC, GaP, $SrTiO_3$ and ZnTe. By way of example, the optical resonating element can comprise, without limitation, any of a ring resonator or a disk resonator. In some embodiments, the material from which the optical resonating element is formed can exhibit a third order nonlinear susceptibility ($\chi^3$) greater than about $10^{-14}$ cm$^2$/W.

Further understanding of various aspects of the invention can be obtained from the following detailed description in conjunction with the associated drawings, which are described briefly below.

DESCRIPTION

Figure 1A:
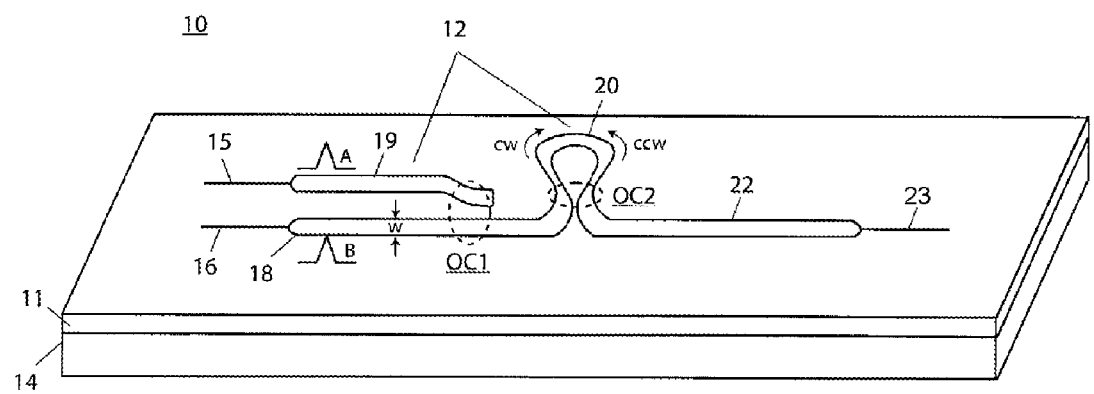
FIG. 1A schematically depicts an optical device according to one embodiment of the invention.

In one aspect, the present invention provides an interferometric optical system formed by a plurality of nanostructures (e.g., TiO$_2$ nanostructures) on a substrate (e.g., a silica-coated silicon substrate) that can provide a logic functionality by utilizing optical interference, e.g., due to non-linear phase accumulation of signals propagating in opposite directions around a loop. The terms "nanostructure" and "nano-sized component" as used herein refer to a material structure (e.g., an optical waveguide, an optical coupler, etc.) that exhibits a size in at least one dimension (e.g., width, length or depth) less than about 1 micrometer, for example, equal to or less than about 500 nm, equal to or less than about 200 nm or equal to or less than about 100 nm. The terms "microstructure" and "micro-sized component" as used herein can refer to a material structure (e.g., an optical waveguide, an optical coupler, etc.) that exhibits a size in at least one dimension (e.g., width, length or depth) less than about 1000 microns, preferably less than about 500 microns, or less than about 200 microns or less than about 100 microns. Generally, in many embodiments of the invention, the size of the components of the optical device in at least one dimension, e.g., in a dimension perpendicular to the propagation direction of the radiation coupled into the device, can be a fraction of the radiation wavelength, e.g., in a range of about ¼ to about ½ of the radiation wavelength. As used herein, an optical component or element, e.g., a waveguide, is "substantially transparent" to a radiation wavelength if radiation having that wavelength can pass through that component/element with a loss in intensity, e.g., due to absorption and/or scattering, that is less than about 5 dB/cm, e.g., less than about 4 dB/cm or less than about 3 dB/cm, or less than 2 dB/cm, or less than 1 dB/cm. As used herein, a material exhibits nonlinearity if it exhibits a non-zero third order nonlinear susceptibility.

Further, the meaning of a phase of an optical signal is known in the art. By way of further illustration, a short description of both linear and nonlinear phase are provided below. A signal (S) can be generally represented as follows:

$$S = A(\vec{r}, t) \exp(i\phi(\vec{r}, t)) \qquad \text{Eq. (1)}$$

wherein,

A represents the signal's amplitude, which can be generally a function of position ($\vec{r}$) and time (t), i represent the imaginary number $\sqrt{-1}$, and $\phi$ represents the signal's phase, which can be generally a function of position ($\vec{r}$) and time (t).

As the signal S can generally be represented as a superposition of monochromatic plane waves, for ease of description, and without any loss of generality, we consider an electromagnetic, monochromatic plane wave (propagating in the z direction, polarized in the x direction), which can be represented as follows:

$$E(z,t) = E_0 e^{i(kz - wt)} \hat{x} \qquad \text{Eq. (2)}$$

Here, E(z,t) is the complex electric field at position z and at time t (the actual field can be determined by taking the real part of Eq. (2)). $E_0$ is the peak amplitude of the electric field, k is the propagation or wave vector, which in a linear isotropic medium is related to the wavelength and the index of refraction by $$k = \frac{2\pi}{\lambda} n$$

where $\lambda$ is the free space wavelength and n is the index of refraction.

For two otherwise identical waves that propagate the same distance through materials having different indices of refraction, they will accumulate different amounts of phase defined here as $$\frac{2\pi n}{\lambda} L,$$

where L denotes the propagation distance. For example, if one wave propagates through a material (having a linear index $n_1$) for a given distance L, the phase accumulated will therefore be $$\phi_1 = \frac{2\pi n_1}{\lambda} L.$$

If a second material propagates the same total distance in a material of linear index $n_2$, the phase will be $$\phi_2 = \frac{2\pi n_2}{\lambda} L.$$

Taking a superposition of these two coherent waves will produce interference. This is easily seen by observing the intensity (which is proportional to $|E|^2$):

$$E_{total}(L, t) = E_0 \left( e^{i\left(\frac{2\pi n_1}{\lambda} L\right)} + e^{i\left(\frac{2\pi n_2}{\lambda} L\right)} \right) e^{-i\omega t} \quad \text{Eq. (3)}$$

$$|\alpha|E|^2 = 2E_0 \left[ 1 + \cos\left(\frac{2\pi L}{\lambda}(n_1 - n_2)\right) \right] \quad \text{Eq. (4)}$$

If a $\pi$ phase shift difference exists between the two waves, no intensity will be observed. Extending this description to non-plane waves (i.e. to guided waves) is well known in the art.

Without being limited to any particular theory, the nonlinear phase accumulation by the wave as it propagates can be understood by considering that the index of refraction of the proposed materials can be expressed as follows:

$$n = n_0 + n_2 I \quad \text{Eq. (5)}$$

wherein,
n represents the effective refractive index,
$n_0$ represents the linear portion of the refractive index,
$n_2$ represents the nonlinear refractive index, and
I represents the intensity of the wave.

The nonlinear refractive index ($n_2$) is related to the third-order nonlinear susceptibility of the material ($\chi^3$). For example, for linearly polarized light in an isotropic medium, $n_2$ (in units of cm$^2$/W) is related to $\chi^3$ (in esu) by the following relation:

$$n_2 = \frac{12\pi^2}{n_0^2 c} 10^7 \chi^{(3)} \quad \text{Eq. (6)}$$

Using Eq. (6), the phase ($\phi$) can be represented as follows:

$$\phi = \frac{2\pi(n_0 + n_2 I)}{\lambda} L = \phi_L + \phi_{NL} \quad \text{Eq. (7)}$$

Where the linear phase is defined as $$\phi_L = \frac{2\pi n_0}{\lambda} L$$

and the nonlinear phase is defined as $$\phi_{NL} = \frac{2\pi n_2 I}{\lambda} L,$$

where the parameters are defined above. As a wave propagates in such a nonlinear medium (possessing a positive nonlinear index), higher intensities produce a larger nonlinear phase per unit distance. Given unequal intensities of two waves (which can be created using the teachings of the invention discussed in more detail below), this can lead to an intensity dependent interference as discussed in more detail below.

By way of example, FIG. 1A schematically depicts an optical device 10 according to one embodiment of the invention that includes a plurality of micro-sized and/or nano-sized optical components 12 formed of TiO$_2$ disposed, e.g., deposited, on an underlying silica-coated silicon substrate 14. In some embodiments, the silica (SiO$_2$) coating 11 can have a thickness in a range of, e.g., about 500 nm to about 5 microns, and preferably greater than about 1000 nm (e.g., about 2000 nm). In this exemplary embodiment, the size of the optical components refers to their size in at least one dimension (e.g., width). In this embodiment, the TiO$_2$ structures 12 can have widths that are in a range of about ¼ to about ½ of the wavelength of the radiation that is coupled into the device, e.g., in a range of about 200 nm to about 500 nm. In this embodiment, the TiO$_2$ structures are assembled into a Sagnac interferometer geometry that can yield a power dependent transmission, which can be used for optical switching and all-optical logic operations, as discussed further below. More specifically, in this embodiment, the TiO$_2$ structures are configured so as to provide the functionality of an all-optical NAND logic gate.

The nonlinear Sagnac interferometer splits an incoming signal into two counter-propagating signals, the ratio of which can be determined by a coupling parameter resulting from the evanescent coupling of light between two nearby waveguides. The two signals accumulate a nonlinear phase primarily from self-phase modulation while propagating around the loop and then recombine interferometrically to be transmitted or reflected. The amount of nonlinear phase accumulated in the loop is proportional to the input power of the pulse, which yields an oscillatory transmission with increasing input power, e.g., for a uniform Sagnac interferometer with a coupling ratio different than 50:50 or for an asymmetric Sagnac interferometer as discussed further below. By choosing the input power and tuning the coupling parameter, the transmission, or output signal, can behave as a logical response to a set of input signals.

With continued reference to FIG. 1A, the device 10 includes two optical waveguides 18 and 19, formed of $TiO_2$, into which optical signals, such as exemplary optical pulses A and B can be launched. A variety of radiation sources can be utilized to generate the optical pulses. For example, in some cases, the pulses can be generated by a femtosecond Ti:Sapphire laser. In many embodiments, an input pulse has an ultrashort duration so as to more readily elicit a non-linearity in the index of refraction of the interferometric structure of the device, as discussed further below. For example, the input pulse(s) can have a duration less than about 1 picosecond (less than about $1\times10^{-12}$ seconds), e.g., less than about 500 femtoseconds (1 femtosecond corresponds to $10^{-15}$ seconds) or less than about 200 femtoseconds, or less than about 100 femtoseconds. In some embodiments, the pulse(s) can have a center wavelength in a range of about 600 nm to about 1.6 microns (e.g., 800 nm), or harmonics of a wavelength in this range.

The waveguides can have a rectangular cross-section with a width (W), which in many cases is in a range of about ¼ to about ½ of the center wavelength of the pulse(s) coupled into the waveguides, and a depth (not shown in the schematic figure) in a range of, e.g., about 50 nm to about 5 microns, e.g., in a range of about 50 nm to about 800 nm (e.g., 400 nm). In some cases, the depth of the waveguide is in a range of about 1 to about 2 microns. In some cases, the waveguides can be in the form of ridge waveguides. In some implementations, silica nanowires 15 and 16 can be used to couple optical pulses generated via an external source to the optical waveguides 18 and 19. For example, as noted above, the optical pulses can include femto-second pulses generated by a femto-second Ti:Sapphire laser.

An optical signal, if any, propagating through the waveguide 19 (such as the exemplary optical pulse A) can be coupled via evanescent waves (in an optical coupling region OC1 shown schematically by a dashed circle) to the optical waveguide 18 to propagate along with the optical pulse B towards an interferometric loop 20. A portion of the pulses is coupled via evanescent waves to the other side of the loop within an optical coupling region (OC2) to propagate in a counter clockwise (CCW) fashion around the loop. The remainder of the energy of the pulses continues to propagate in a clockwise (CW) fashion around the loop. In some cases, the interferometric loop can have a circumference (2 πr, where r is the radius of the loop) that is several multiples of the center wavelength of the propagating radiation pulses, e.g., in a range of about 1 micron to about 100 microns. In some embodiments, the interferometric loop may not be substantially circular, but may have other geometrical shapes. For example, it may in the form of a winding path. In some embodiments, the longer the optical path provided by the loop, the less is the required power. Hence, in some embodiments, the length of the loop (the length of the path around the loop traversed by radiation) can be, e.g., tens of centimeters or longer.

Depending on the coupling parameter (ρ) between the two portions of the interferometric loop within the optical coupling region OC2 (shown schematically by a dashed circle) as well as the input power of the pulses A and B, the intensity of the CW and CCW propagating signals can be different. As a result, the non-linear contribution of the signals to the index of refraction of the material forming the loop can be different. This can result in different phase accumulation (phase change) for the CW and CCW signals as they propagate around the loop. In some cases, the optical coupling parameter ρ can be, e.g., in a range of about 0.3 to about 0.4, and the input pulse power can be characterized by a peak power less than about 100 Watts.

As the nonlinear contribution to the refractive index depends on the intensity of the signal's applied electric field, the refractive index increases as the signal intensity increases. Hence, for two signals propagating through the medium such that the two do not overlap substantially in space or time, the one having a greater intensity accumulates nonlinear phase, and hence total phase, more rapidly due to self phase modulation.

After propagating around the loop, a portion of the CCW propagating signals is coupled via evanescent waves to the CW propagating signal within the coupling region OC2. As the phases of the two signals can be different after their propagation around the loop, the coupling can result in an optical interference that affects the intensity of an output signal that would be propagating along an output waveguide 22. In this embodiment, the output logic signal can be coupled out of the device via a silica nanowire 23. In some cases, the optical device 10 can be part of an integrated circuit formed on the substrate 14, and the output logic signal can be applied to another component of the integrated circuit.

In this implementation, the degree of coupling between the signals within the coupling region OC2 as well as the power of the input pulses are chosen to form a NAND logic gate that provides the following truth table (Table 1 below), where A and B refer to the input signals and Q refers to the output signal:

TABLE 1

| A | B | Q |
|---|---|---|
| 0 | 1 | 1 |
| 1 | 0 | 1 |
| 0 | 0 | 1 |
| 1 | 1 | 0 |

Figure 1B:
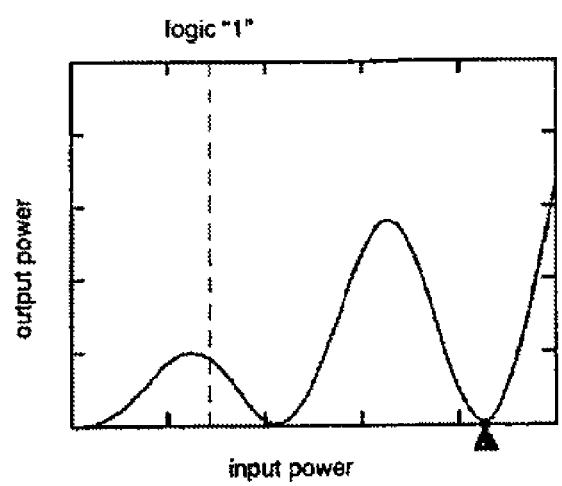
FIG. 1B depicts an exemplary output power as a function of input power applied to one of the input ports of the device of FIG. 1A, exhibiting a power-dependent transmission, FIG. 2A schematically depicts a Sagnac interferometric loop according to an embodiment of the invention to which a loss mechanism is asymmetrically coupled, FIG. 2B schematically depicts an exemplary implementation of the interferometric loop of FIG. 2A in which enhanced surface roughness of a portion of the loop waveguide forms the loss mechanism, FIG. 3A schematically depicts an interferometric component according to an embodiment of the invention in which a gain medium that is pumped by a pump radiation is employed to provide asymmetry for counter-propagating pulses in a Sagnac loop, FIG. 3B schematically depicts an asymmetric gain profile that an exemplary implementation of the gain medium employed in the interferometric component of FIG. 3A can provide, FIG. 3C schematically depicts an alternative implementation of the interferometric component of FIG. 3A in which an output coupler is employed to couple the pump radiation out of the loop, FIG. 3D schematically depicts an interferometric component according to an embodiment of the invention in which a gain mechanism that is pumped by a pump radiation is disposed within a portion of an interferometric loop, FIG. 3E schematically depicts an alternative implementation of the interferometric component of FIG. 3D in which an output coupler is employed to couple the pump radiation out of the loop, FIG. 4 schematically depicts the broadening of a signal due to passage through a dispersive medium, FIG. 5A schematically depicts an interferometric component according to another embodiment of the invention in which a dispersive element is employed to cause asymmetry for nonlinear phase accumulation of two optical signals propagating in opposite directions around an interferometric loop, FIG. 5B schematically depicts an exemplary implementation of the interferometric component of FIG. 5A in which a portion of a waveguide forming the interferometric loop is configured to function as a dispersive element.

In the above table, "0" refers to a vanishing signal, or more generally a signal having a peak intensity below a threshold, while "1" refers to a signal having an intensity above a threshold. By way of example, FIG. 1B depicts an exemplary output power as a function of input power applied to one of the input ports of the device 10, exhibiting a power-dependent transmission. The dotted vertical line in FIG. 1B indicates that the input power pulse that represents a logical level "1".

In some cases, the device 10 can include a top cladding layer (e.g., $SiO_2$) to provide mechanical stability and resistance to environmental factors such as dust. By way of example, such top cladding layer can be deposited using chemical vapor deposition, plasma enhanced chemical vapor deposition, sputtering, atomic layer deposition, electron beam evaporation, etc.

As discussed above, in the above optical device 10, an asymmetric non-linear accumulation of phase by the two optical signals propagating in clock-wise and counter clockwise directions around the interferometric loop 20 can be achieved by adjusting the optical coupling coefficient between the CW and CCW directions. In other embodiments, in addition to such adjustment of the coupling coefficient or instead of it, other mechanisms can be employed to cause asymmetry in non-linear accumulation of phase for signals propagating in CW and CCW directions. Some examples of such mechanisms include: loss mechanisms, gain mechanisms and dispersive mechanisms (e.g., material, waveguide or modal dispersion). Further, in some cases, the asymmetry can be achieved by utilizing additional signals to cause cross phase modulation rather than self phase modulation. In some implementations of such embodiments, a mechanism for causing asymmetry can be positioned offset from the center of the loop so that the clockwise and counterclockwise optical pulses would experience the effect of the mechanism at different times during their travel around the loop.

Figure 2A:
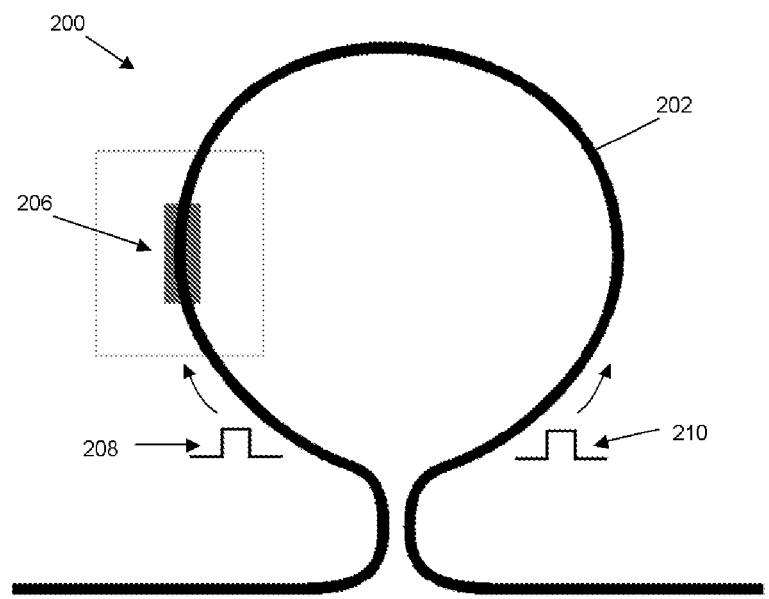

For example, FIG. 2A schematically shows an interferometric loop 202 that can be utilized in a device according to the teachings of the invention, such as the above device 10, in which a loss mechanism 206 is incorporated. The loop can be a nano-sized waveguide that has a width that is a fraction (e.g., in a range of about ¼ to about ½) of the propagating radiation wavelength, e.g., in a range of about 200 nm to about 500 nm. A CW propagating optical pulse 208 encounters the loss mechanism earlier in its travel through the loop than a CCW propagating pulse 210. In other words, unlike the CW pulse, the CCW pulse remains unaffected by the loss mechanism for the majority of the temporal period it travels around the loop. Hence, even if the two pulses have initially the same intensity, the loss mechanism causes an asymmetry in their intensities and hence in the way they accumulate phase non-linearly. In this implementation, the CW pulse 208 encounters the loss mechanism first and hence accumulates less non-linear phase (due to a decrease in its intensity) than the CCW pulse that encounters the loss mechanism later as it propagates around the loop. This arrangement can be advantageous because both pulses can have similar intensities when recombined, e.g., in a manner discussed above in connection with the device 10, while having different amounts of accumulated nonlinear phase. This can in turn allow full intensity modulation of the output signal generated via interference of the CW and CCW pulses.

The loss mechanism 206 can be implemented in a variety of different ways. For example, additional material can be added, e.g., as a cladding layer, over a selected portion of the loop, to function as a loss mechanism by causing, e.g., light scattering and/or light absorption. By way of example, a cladding section formed of a material that causes scattering, e.g., due to a sudden (non-adiabatic) index change caused by the presence of the material, or due to defects, grain boundaries, or interfacial roughness, etc., can be employed. In such a case, the portion of the optical signal that is guided in the cladding experiences loss due to scattering, e.g., as a result of change in the index of refraction. For example, adding an $SiO_2$ cladding portion to a waveguide that otherwise does not include a cladding other than air would cause scattering of a portion of the radiation. As another example, the cladding portion can be formed of a material, e.g., a composite material such as a mixture of $SiO_2$ and nanoparticles, that can cause absorption of a portion of the optical signal that is guided through the cladding. For example, quantum dots can be incorporated using the sol-gel method.

Figure 2B:
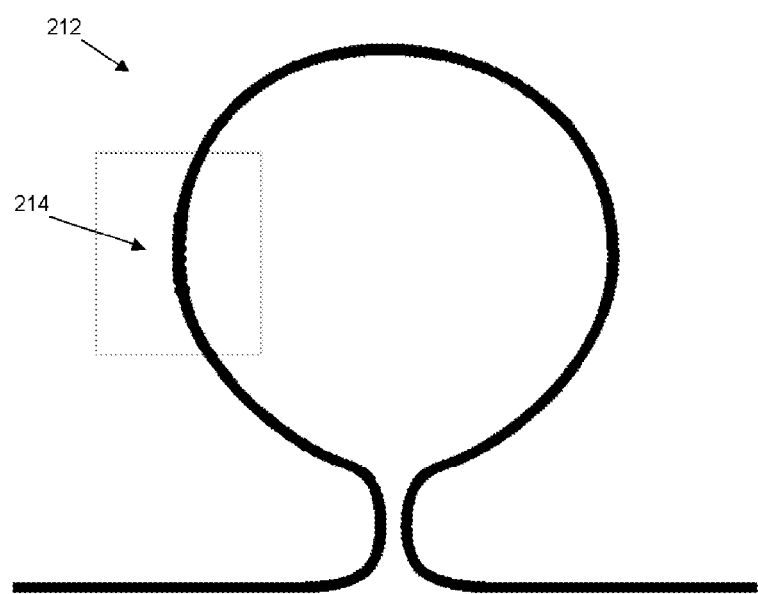

By way of further example, FIG. 2B shows a Sagnac loop 212 to a portion of which 214 additional surface roughness has been imparted to deliberately cause scattering of a portion of an optical signal out of the loop, thereby providing attenuation resulting in an asymmetry for the CW and CCW propagating optical pulses.

In some embodiments, a gain mechanism can be employed to cause asymmetry for the counter propagating optical pulses. The gain mechanism can present an asymmetric gain profile such that one optical pulse would experience optical gain early in its propagation around the loop and the other would experience gain later. The optical pulse experiencing gain early can accumulate a larger nonlinear phase, thus leading to an asymmetric phase accumulation by the two pulses.

The gain mechanism can be implemented in a variety of ways. In some implementations, a temporally changing excited carrier population (e.g., one changing due to stimulated emission) can be employed to generate an asymmetry in the index of refraction encountered by two counter-propagating optical pulses. For example, a clockwise optical pulse can deplete a gain profile of excited carriers by causing stimulated emission, thus leaving behind a different gain profile and a different effective index for the counter-clockwise optical pulse. This change in the effective index is caused by plasma dispersive effects, which is in addition to the effects of self phase modulation.

Figure 3A:
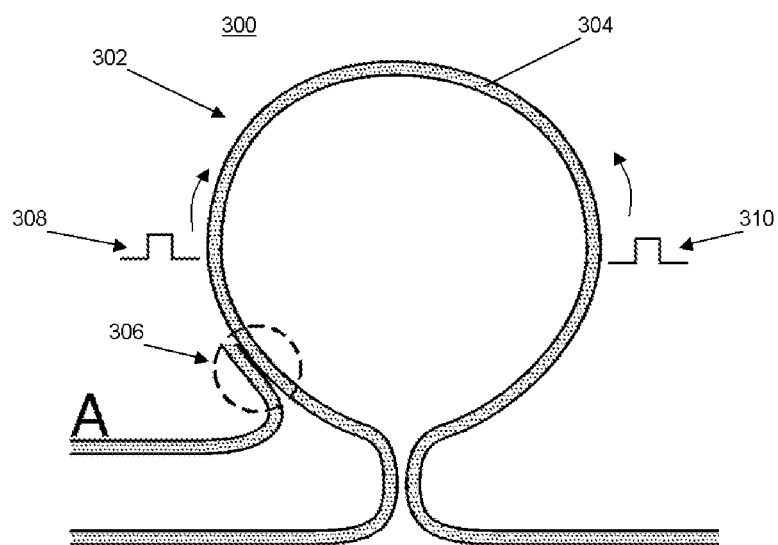
Figure 3B:
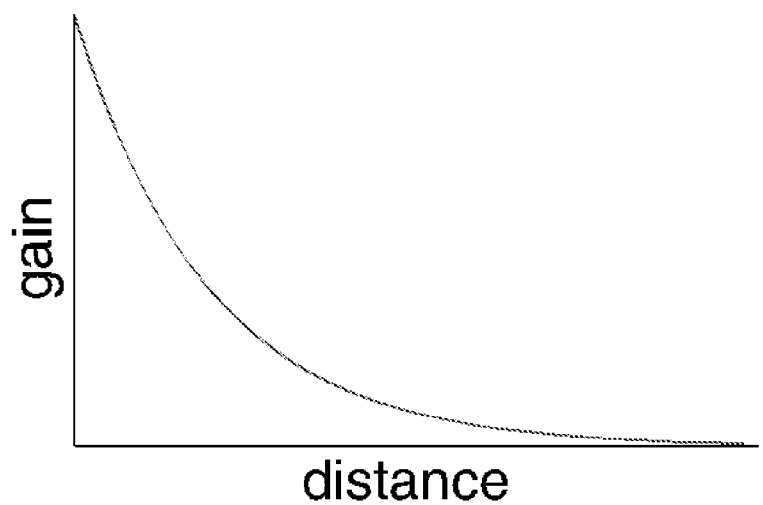

By way of example, FIG. 3A exhibits an exemplary interferometric component 300 that includes an interferometric loop 302 (e.g., a nano-sized waveguide having a width that is a fraction (e.g., in a range of about ¼ to about ½) of the propagating radiation wavelength, e.g., in a range of about 200 nm to about 500 nm), which is uniformly doped with a gain medium 304. By way of example, the loop 302 can be formed of $TiO_2$ and doped with rare earth ions (e.g., $Nd^{3+}$, $Er^{3+}$, $Tm^{3+}$ or $Yb^{3+}$, etc.). By way of example, the sol-gel method can be employed to achieve such doping. A waveguide A is optically coupled to the loop 302 in a coupling region 306, e.g., via evanescent optical coupling, to allow delivering an excitation (pump) radiation, e.g., one or more optical pulses or continuous-wave radiation, to the gain medium in the loop. In many implementations, a laser (not shown), e.g., a diode laser, supplies the excitation pulse. The wavelength of the excitation radiation can be selected to be different than the wavelength of the signal optical pulses. Further, the optical coupling parameter is preferably selected to minimize out-coupling of the counter-clockwise signal while maintaining a reasonable coupling of the pump into the loop. In this implementation, a pump pulse will be absorbed as a function of distance from the coupling region 306 as it travels clockwise around the loop 302. Such an absorption of the pump pulse generates an exponentially decreasing gain profile as a function of clockwise distance from the coupling region 306, as shown schematically in FIG. 3B. In other words, the pump pulse can generate an asymmetric gain profile in the loop 302.

Such an asymmetric gain profile provides a greater boost to the intensity of a clockwise propagating pulse 308 early in its propagation relative to a counter-clockwise propagating pulse 310, thus allowing the clockwise pulse to accumulate more non-linear phase. In contrast, the counter-clockwise propagating pulse 310 will propagate with little additional gain until the last portion of its path, and hence accumulates less non-linear phase. In addition, the change in the population of the excited gain medium due to depletion as the optical pulses travel around the loop also causes a change in the index of refraction of the loop material as a function of distance, thereby producing additional asymmetry. The pump laser radiation can be continuous-wave or pulsed, e.g., depending on optimizing the gain asymmetry or index-of-refraction asymmetry. For example, a continuous-wave optical pump radiation can be employed to optimize the gain profile (e.g., optimized to create a temporally constant gain profile) and a pulsed optical pump radiation can be utilized to optimize a change in the index of refraction (e.g., by creating a gain profile that changes substantially after amplifying a pulse and does not get replenished until the next pump pulse).

Figure 3C:
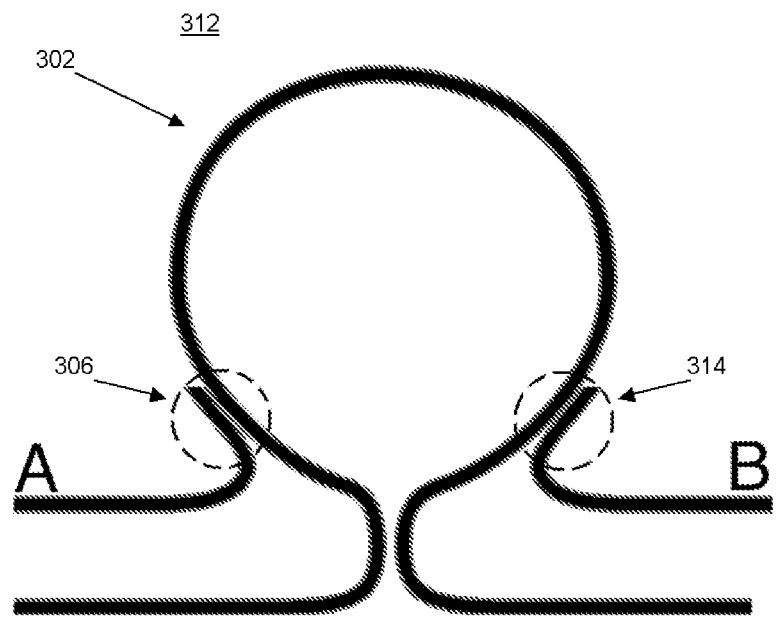

With reference to FIG. 3C, an alterative implementation 312 of the above interferometric component 300 includes a waveguide output coupler B that is optically coupled to the loop 302 within a coupling region 314 for coupling the pump radiation (or at least a portion thereof) out of the loop at the end of its travel through the loop. The coupling region 314 is preferably configured to only affect the pump radiation and has minimal, and preferably no, impact on the optical pulses traveling around the loop. Such a coupling region can be implemented by employing coupled mode theory. Light propagating in a waveguide that is parallel to a second waveguide will couple to the adjacent waveguide as a function of propagation distance. Once in the second waveguide, light will begin to couple back into the first waveguide producing an oscillatory behavior. For example, a 50:50 splitter can be created by having the waveguides diverge after an appropriate distance. The coupling parameter that dictates how strongly energy is coupled between the waveguides (for example, what distance is required to achieve a particular coupling ratio) can be strongly wavelength dependent given asymmetric waveguides. Thus, a properly engineered coupler can be made to transfer radiation having one wavelength to the second waveguide while rejecting (i.e., not coupling) radiation having a different wavelength. In this example, the pump wavelength can be chosen to be reasonably separated from the signal, enabling such a differential coupling. By way of example, the difference between the pump wavelength and the signal wavelength can be about 20 nm. The portion of the pump radiation that is coupled out of the loop can supply one or more additional devices (logic devices or otherwise) or be discarded. Such output coupling of the pump radiation can be advantageous particularly in cases in which the attenuation of the pump radiation around the loop is small.

Figure 3D:
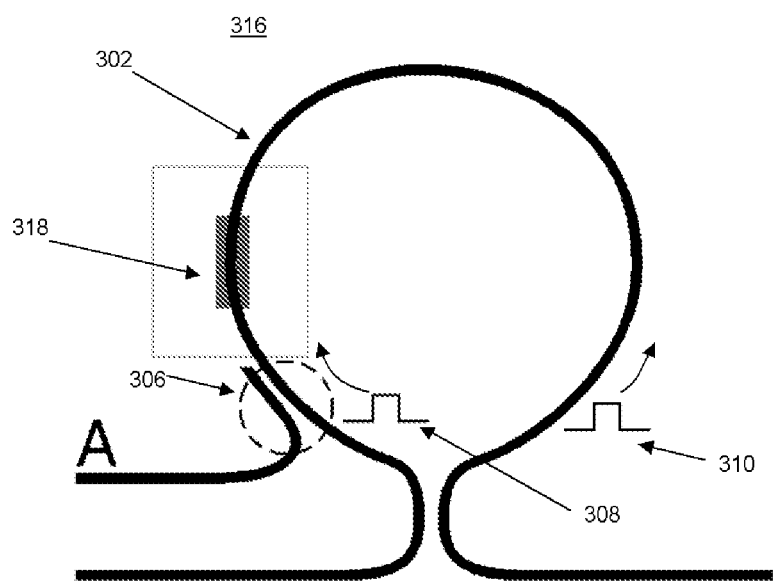

Rather than having a uniform distribution of a gain medium around the interferometric loop, in some embodiments a gain medium is located asymmetrically within only a portion of the loop. By way of example, FIG. 3D schematically depicts such an interferometric component 316, which includes a gain medium 318 disposed within a portion of the interferometric loop 302. By way of example, the loop can be formed of $TiO_2$ and the gain medium can include a plurality of rare earth ions embedded in the loop material.

Similar to the embodiment of FIG. 3A, a waveguide A that is optically coupled to a portion of the loop, e.g., via evanescent optical coupling, allows delivering pump radiation (e.g., continous-wave or pulsed radiation) to the gain medium. Again, the gain medium presents an asymmetric gain profile to the counter-propagating signal pulses 308 and 310, leading to an asymmetry in the non-linear phase accumulation of the signals.

Figure 3E:
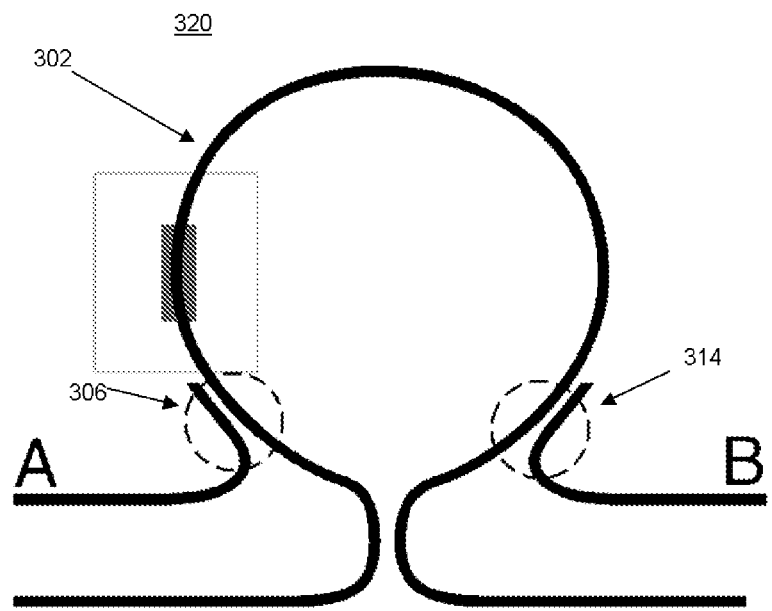

With reference to FIG. 3E, in an alternative implementation 320 of the interferometeric component 316, in addition to a waveguide A for coupling pump radiation into the gain medium 318, an output waveguide B, which is optically coupled to the loop 302 (e.g., via evanescent coupling) in a coupling region 314, allows coupling the pump radiation out of the loop. Again, the output waveguide B has minimal, and preferably no, effect on the counter-propagating optical pulses.

Figure 4:
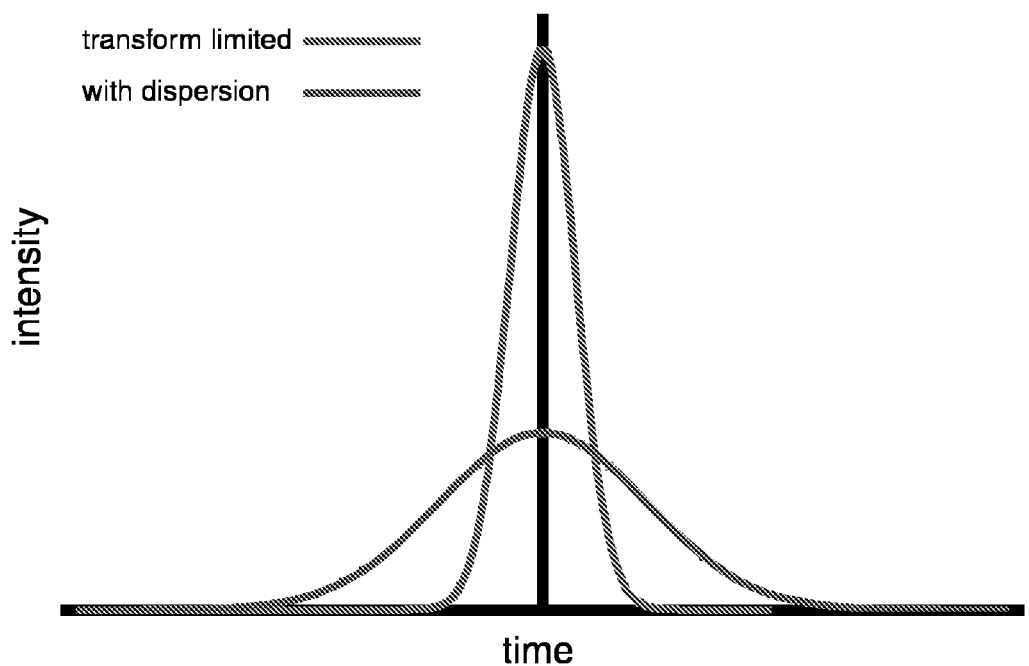

In some embodiments, dispersive effects are utilized to generate asymmetry for non-linear phase accumulation of the counter-propagating pulses. As known in the art, dispersion refers to variation of effective phase velocity (which is related to the refractive index) for radiation propagating in a medium (e.g., a waveguide) as a function of radiation wavelength. An optical pulse propagating in a dispersive waveguide may exhibit a temporal change in its intensity profile as a function of distance traveled. By way of example, a transform limited Gaussian pulse (that is, the shortest pulse for a given bandwidth) traveling through a dispersive waveguide, which exhibits either normal or anomalous dispersion, can broaden in time, as shown schematically in FIG. 4. Such broadening results in a lowering of the pulse's peak intensity while maintaining its energy. The broadening of the pulse can be 'undone' by passing the pulse through a medium exhibiting the opposite dispersion relation. A pulse that has undergone dispersive broadening will accumulate nonlinear phase at a slower rate than an identical pulse that has not undergone such a dispersive broadening.

Figure 5A:
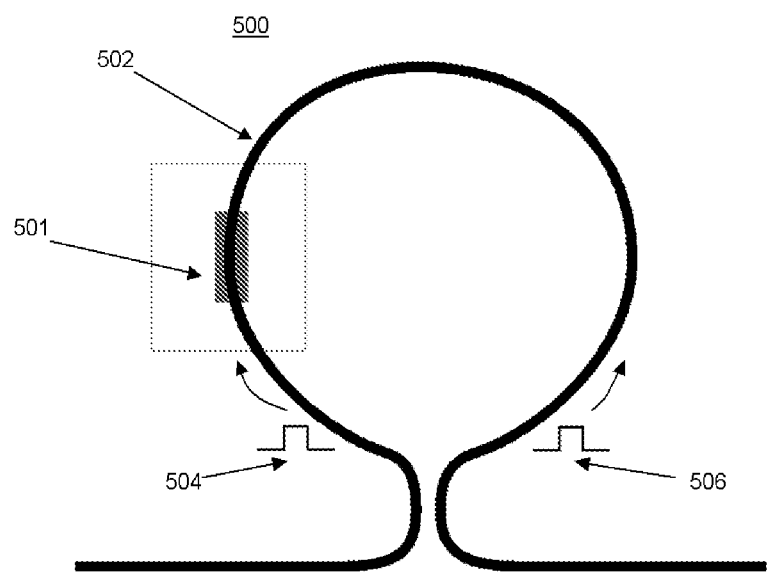
FIG. 5C shows waveguide dispersion as a function of wavelength for silica fibers of different diameters, FIG. 6A schematically depicts an interferometric element according to another embodiment of the invention having a Mach-Zehnder configuration, FIG. 6B schematically depicts an interferometric element according to an alternative implementation of the element shown in FIG. 6A in which a loss mechanism in disposed in each branch of the interferometric element, FIG. 6C schematically depicts an interferometric element according to an embodiment of the invention having a Mach-Zehnder configuration in one branch of which a gain medium is disposed, FIG. 6D schematically depicts an interferometric element according to an alternative implementation of the element shown in FIG. 6C in which each branch includes a loss mechanism, where the loss mechanisms are offset relative to one another, FIG. 7A schematically depicts a Mach-Zehnder interferometric element according to one embodiment of the invention in which a dispersive element is disposed in one of its branches, FIG. 7B schematically depicts a Mach-Zehnder interferometric element according to another embodiment which includes two dispersive elements disposed in one of its waveguide branches, FIG. 8 schematically depicts a Mach-Zehnder interferometric element according to an embodiment with two waveguide branches formed of different materials, FIG. 9 schematically depicts an interferometric element according to an embodiment of the invention having a Michelson configuration, FIG. 10 schematically depicts an optical device according to an embodiment of the invention that includes an optical resonator, FIG. 11 schematically depicts an optical switch according to an embodiment of the invention, FIG. 12A schematically depicts coupling of a control signal to the optical resonator of the switch of FIG. 11, FIG. 12B schematically depicts a resonance shift caused by the coupling of the control signal, as shown in FIG. 12A, to the optical resonator of the switch of FIG. 11, FIG. 12C schematically depicts coupling of an input signal applied to the switch of FIG. 11 to the optical resonator, in an off-state of the switch, due to a shift caused in the frequency of at least one resonance mode of the resonator by coupling of the control signal thereto, FIG. 12D schematically depicts an on state of the switch of FIG. 11 in which the input signal is off resonance relative to the modes (or at least many modes) of the optical resonator, FIG. 13 schematically depicts an optical disk resonator according to an embodiment of the invention, FIG. 14 schematically depicts an interferometric device according to one embodiment in which cross-modulation is employed using a control pulse to provide asymmetry, FIG. 15A schematically depicts an optical switch 4:1 multiplexer according to one embodiment of the invention.

By way of example, FIG. 5A schematically depicts an interferometric component 500 according to an embodiment of the invention in which a dispersive element 501 is employed to cause asymmetry for phase accumulation of two optical signals propagating in opposite directions around an interferometric loop waveguide 502. In this implementation, the loop 502 provides a waveguide through which counter-propagating signals 504 and 506 propagate. In this implementation, a portion of the waveguide 502 forms the dispersive element 501 through the use of a different cladding material than that used for the remainder of the loop and/or a different waveguide material. For example, if air is used as a cladding material, the addition of $SiO_2$ or a similar material (having a lower index than the waveguide) will change the waveguide's dispersion relation (if the waveguide's dimensions remain constant). In some cases, the transition region between air-cladding to $SiO_2$-cladding can be designed to provide an adiabatic transition in order to minimize scattering losses. Alternate materials can also be used for the partial cladding region which exhibit different material dispersion (e.g., different wavelength dependent refractive index).

Figure 5B:
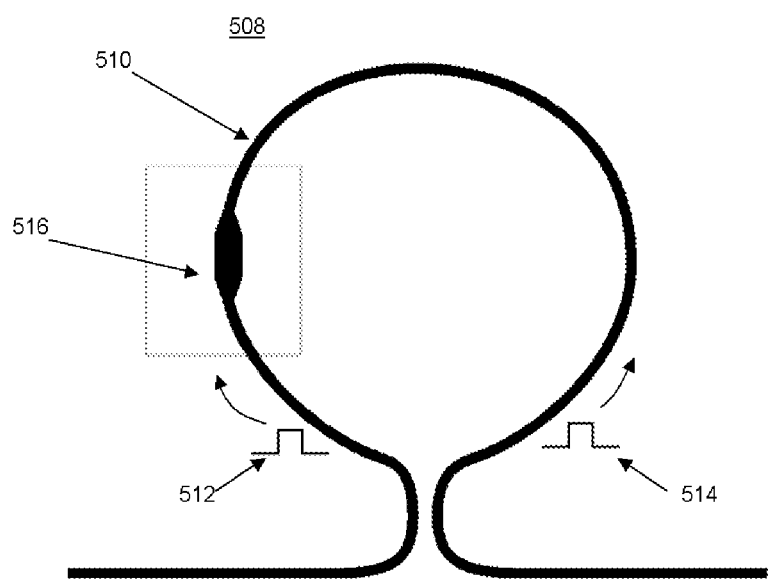
Figure 5C:
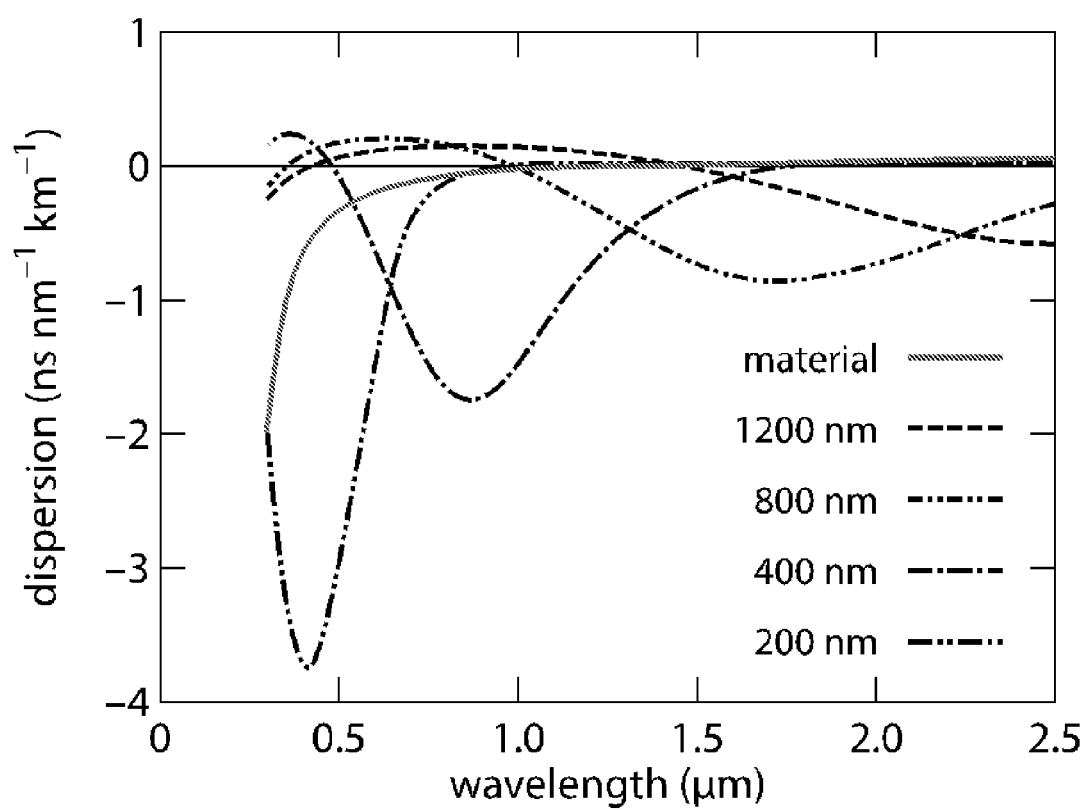

By way of another example, FIG. 5B schematically depicts another interferometric component 508 that employs dispersive effects for creating asymmetry in an interferometric loop waveguide 510 for two counter-propagating optical signals 512 and 514. In this exemplary implementation, a portion 516 of the waveguide forming the loop 510 functions as a dispersive element. This dispersive element can be implemented by changing the dimensions of the waveguide. For example, consider the dispersion relation for silica fibers of different diameters shown in FIG. 5C. The material dispersion of silica is relatively flat until roughly about 1 micron. However, a cylindrical silica fiber (with an air cladding) has a very different dispersion relation that changes as a function of the diameter. A similar effect occurs in channel or ridge type waveguides. Consequently, by changing the dimensions of a portion of the waveguide, it is possible to tailor the dispersion of that portion of the waveguide, and consequently, the duration and peak intensity of the pulses.

The interferometric components that can be utilized in the practice of various aspects of the invention are not limited to those that have a Sagnac configuration. Other interferometric configurations, such as Mach-Zehnder and Michelson interferometer, can also be employed.

Figure 6A:
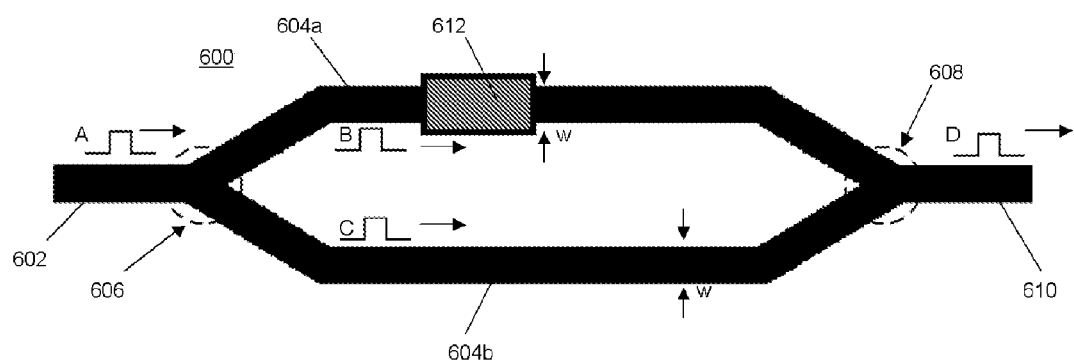

By way of example, FIG. 6A schematically depicts an interferometric element 600 according to an embodiment of the invention that has a Mach-Zehnder configuration. The interferometric element 600 includes a waveguide 602 providing an input port for receiving at least one input optical signal, such as input signal A. The waveguide 602 is coupled to two waveguide branches 604a and 604b using a Y-junction 606 that is configured to split the incoming signal A into a signal B propagating in the upper waveguide branch 604a and a signal C propagating in the lower waveguide branch 604b. The two waveguide branches 604a and 604b are combined using a Y-junction 608 that is configured to combine the signals propagating in the upper and lower waveguide branches 604a and 604b into an output signal D exiting the interferometer element through an output waveguide 610.

In this implementation, the input Y-junction is configured such that about 50% of the energy of an incoming optical pulse is coupled into the upper waveguide branch and about 50% of the energy is coupled into the lower waveguide branch. In other words, the ratio of the coupling coefficients for the upper and the lower branches is about 1. In other cases, other coupling ratios can be employed.

In this embodiment, the waveguide branches 604a and 604b (and in many implementations, the input and output waveguides as well) have a width W that is a fraction of the central wavelength of the optical pulses (e.g., in a range of about ¼ to about ½ of the wavelength). For example, the width W can be less than about 1 micron, and in some cases equal to or less than about 500 nm or equal to or less than about 200 nm or equal to or less than about 100 nm. The waveguides can be formed of a variety of materials. In many implementations, the waveguides are formed of a material that exhibits a high non-linear susceptibility, e.g., a high third-order susceptibility ($\chi^{(3)}$). By way of example, the waveguides can be formed of $TiO_2$.

As the optical pulses B and C propagate through the upper and the lower waveguide branches, they accumulate phase non-linearly. In this implementation, a loss mechanism 612 is disposed in one of the waveguide branches (in this case, in the upper branch) to generate an asymmetry in the non-linear phase accumulation of the two pulses. This asymmetry can be designed to affect the intensity of the output pulse, which is generated as a result of the interference of the two signals B and C subsequent to their phase accumulation due to propagation in the upper and the lower waveguide branches, respectively, in a manner suitable for a particular application, e.g., an optical logic application.

The loss mechanism 612 can be implemented in a variety of ways. By way of example, in some cases, a radiation absorbing material can be incorporated within a portion of one of the waveguide branches (in this case the upper portion) to absorb a portion of the optical signal passing therethrough. By way of example, the radiation absorbing material can have a bandgap less than the photon energy of the signals, e.g., the radiation absorbing material can be GaAs for signals having a wavelength of about 800 nm. This reduction in the signal intensity in turn results in a reduction in non-linear phase accumulation for that signal relative to the phase accumulation by the signal propagating in the branch lacking the loss mechanism. In some implementations, the loss mechanism can be implemented by incorporating an absorbing material in a portion of the cladding of one of the waveguide branches. In other cases, controlled radiation scattering can be used as a loss mechanism. For example, a portion of the surface of one of the waveguide branches can be roughened to cause scattering of a portion of the energy in an optical pulse passing through that section of the waveguide out of the waveguide, or at least out of the direction of signal propagation. In other cases, a plurality of laser damage scattering centers can provide the loss mechanism. Further, in some cases, nanoparticles that can cause radiation absorption and/or scattering can be incorporated in a portion of one of the waveguides and/or deposited on a surface portion of one of the waveguides to function as a loss mechanism. For example, quantum dots can be engineered to provide such absorption. Any combination of the above loss mechanisms can also be employed.

Figure 6B:
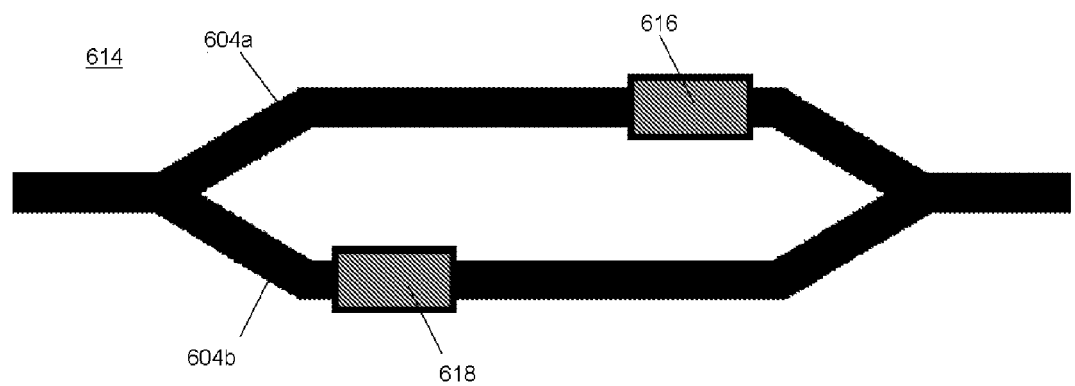

FIG. 6B schematically depicts an interferometric element 614 based on an alternative implementation of the above interferometric element 600 having a Mach-Zehnder configuration in which two loss mechanisms 616 and 618 are disposed in the two waveguide branches 604a and 604b. The loss mechanisms are offset relative to one another to cause asymmetry in non-linear phase accumulation between the signals propagating in the two waveguide branches. For example, in cases in which two optical signals having substantially equal intensities enter the two waveguide branches, the optical signal propagating in the lower branch encounters the loss mechanism 618 early and hence accumulates less non-linear phase than the optical signal propagating in the upper branch that encounters the loss mechanism 616 toward the end portion of its travel. Notwithstanding this asymmetry in phase accumulation, the loss mechanisms can be designed (e.g., by ensuring that they provide the same degree of loss) such that the intensities of the two optical signals at the end of their travel in their respective waveguide branches would be the same.

Figure 6C:
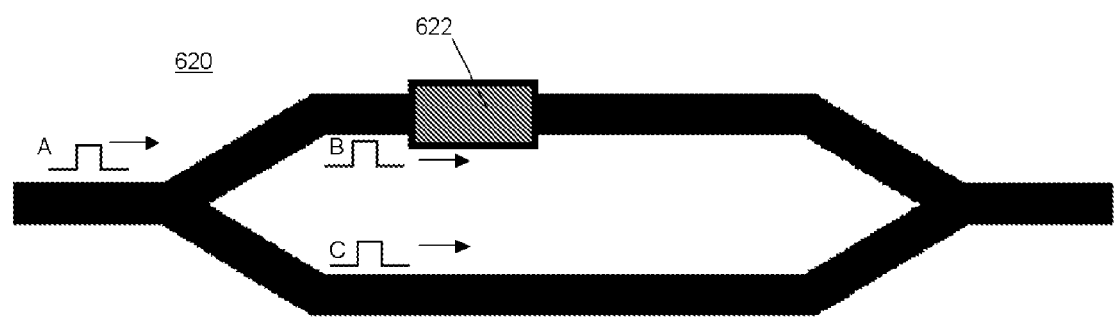

FIG. 6C schematically depicts another interferometric element 620 based on the Mach-Zehnder configuration that employs a gain medium 622, rather than a loss mechanism, for generating asymmetry in the non-linear phase accumulation of two optical signals one of which propagates in the upper waveguide branch of the interferometric element and the other propagates in the lower waveguide branch. In some implementations, the gain medium can be optically pumped to generate excited states carriers, e.g., in a manner discussed in connection with the embodiment of FIG. 3D.

By way of example, in use, two optical pulses B and C having substantially similar intensities can enter the upper and the lower branches (the pulses can be formed, e.g., by 50:50 split of an incoming pulse A). The pulse propagating in the upper branch has a higher intensity after passage through the gain medium, and hence accumulates non-linear phase at a faster rate while passing through a portion of the waveguide beyond the gain medium than the pulse propagating in the lower branch. In some implementations, a gain mechanism can be disposed at the end of the travel of the pulse C through the lower branch, but before the region in which pulse C is coupled to pulse B to generate an output signal, so as to boost the intensity of pulse C to the level of pulse B after its passage through the gain mechanism 622.

Figure 6D:
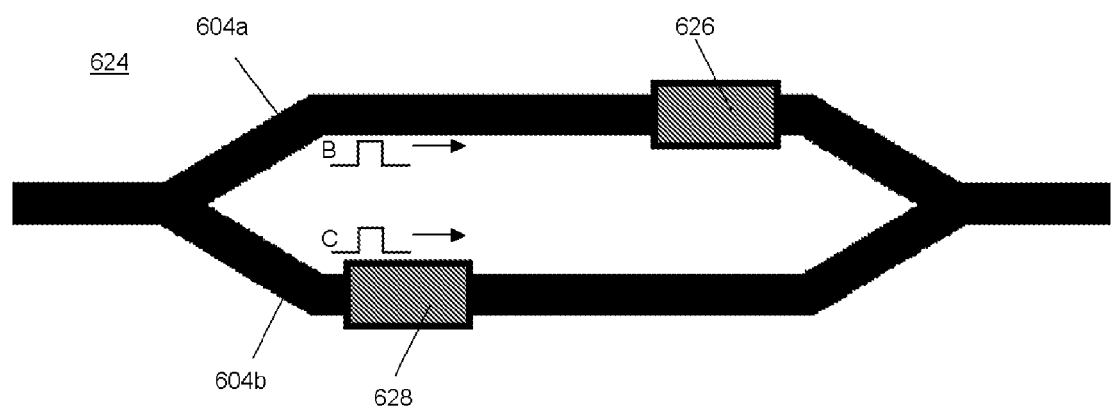

In some other implementations, a gain medium can be disposed in each of the two waveguide branches of a Mach-Zehnder interferometric element with the elements offset relative to one another to cause asymmetry in non-linear phase accumulation. For example, FIG. 6D schematically depicts an interferometric element 624 according to such an implementation in which a gain element 626 is disposed in the upper waveguide branch 604a and another gain element 628 is disposed in the lower waveguide branch 604b. The two gain elements are offset relative to one another such that the optical signal propagating in the lower branch encounters its respective gain medium first, which can lead to an asymmetric non-linear phase accumulation by the two optical signals. For example, in use, two optical signals B and C having substantially identical intensities can enter the upper and the lower waveguide branches, respectively. The optical signal C traveling in the lower branch travels along a larger portion of its respective waveguide at a higher intensity—due to early encounter with the gain element—than the optical signal B propagating in the upper waveguide branch. This in turn leads to asymmetry in the nonlinear phase accumulation by the two signals.

Figure 7A:
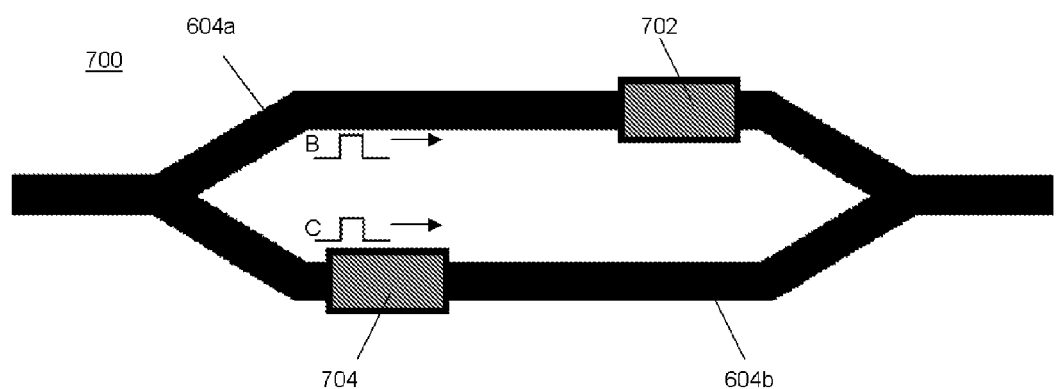

In some embodiments, dispersive elements can be used in an interferometric element according to the teachings of the invention having a Mach-Zehnder configuration to provide asymmetric non-linear phase accumulation of two optical signals propagating in the two waveguide branches of the element. By way of example, FIG. 7A schematically depicts a Mach-Zehnder interferometric element 700 according to an exemplary implementation of such an embodiment in which a dispersive element 702 is disposed in an upper waveguide branch 604a of the interferometric element and another dispersive element 704 is disposed in its lower waveguide branch 604b. The dispersive elements are offset relative to one another so as to provide asymmetry in non-linear phase accumulated by two signals propagating in the upper and lower branches. By way of example, two optical signals B and C in the form of two transform-limited pulses having substantially equal intensities and pulsewidths can be coupled into the upper and the lower branches, respectively. The dispersive elements 702 and 704 can be configured to cause broadening of the pulses passing therethrough. The optical pulse C, due to its earlier encounter with the dispersive element 704, exhibits a lower peak intensity over a larger portion of its respective waveguide than the optical pulse B. Accordingly, the non-linear phase accumulated by the optical pulse C at the end of its travel through the lower waveguide branch is less than that accumulated by the optical pulse B at the end of its travel through the upper branch.

The dispersive elements 702 and 704 can be implemented in a variety of ways. For example, they can be implemented by changing dimensions of a portion of the waveguide, changing materials from which a portion of the waveguide is formed, changing the cladding material over a portion of the waveguide, or a combination of these techniques.

In some cases, another dispersive element is disposed at the end of each waveguide to change the frequency dependent spectral phase (commonly referred to as chirp) to, for example, restore the pulse widths of the pulses to transform-limited values or to other values to be used with subsequent optical components.

In some implementations, rather than causing broadening of the pulses, the dispersive elements can be configured to correct for dispersion of chirped input pulses that are temporally broad.

Figure 7B:
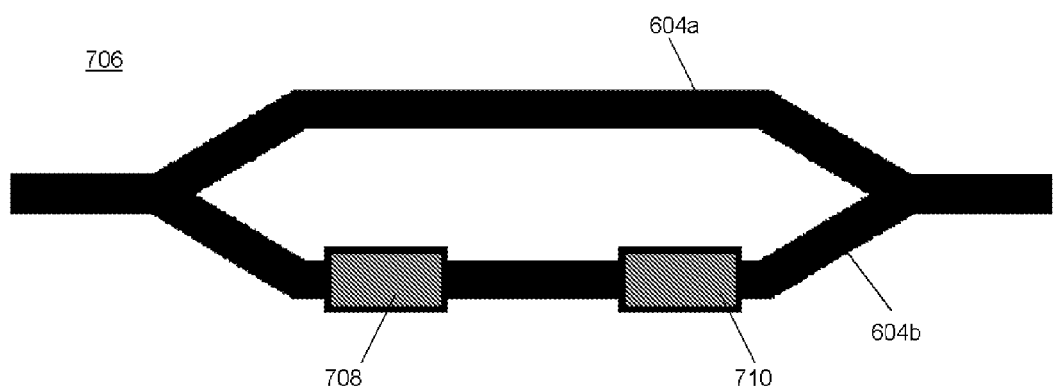

By way of another example, FIG. 7B schematically depicts a Mach-Zehnder interferometric element 706 according to another implementation in one branch of which two dispersive elements 708 and 710 are disposed. One of the dispersive elements (e.g., dispersive element 708) broadens an optical pulse passing therethrough and the other dispersive element (e.g., dispersive element 710) shortens an optical pulse passing therethrough. The absence of a dispersive element in the other branch creates asymmetry between the optical pulses propagating in the two branches.

Figure 8:
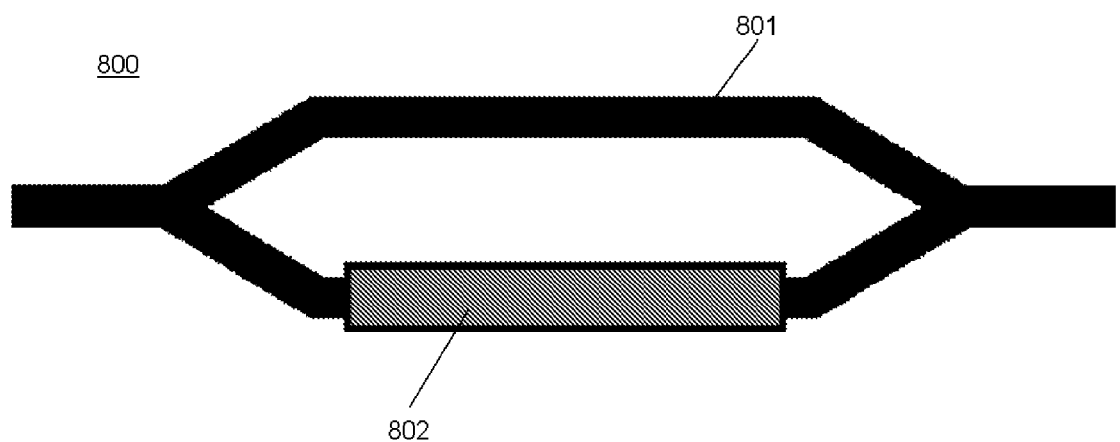

In some embodiments, the two waveguide branches of a Mach-Zehnder interferometric element are formed of different materials that exhibit different degrees of non-linearity (e.g., different third order nonlinearity susceptibility) to impart an asymmetric (unequal) non-linear phase accumulation to two optical signals propagating through those branches. By way of example, FIG. 8 schematically depicts a Mach-Zehnder interferometric element 800 according to such an embodiment that includes an upper waveguide branch 801 formed of one material and a lower waveguide branch 802 formed of another material. In this case, the material forming the upper branch exhibits a higher nonlinearity, e.g., a greater third order susceptibility. By way of example, the upper waveguide branch can be formed of $TiO_2$ (or other suitable materials such as those listed below) and the lower waveguide branch can be formed of $Al_2O_3$.

By way of example, in use, two substantially identical pulses can be coupled to the upper and the lower branches. Due to the higher nonlinearity of the upper branch, the optical pulse propagating in that branch accumulates more nonlinear phase than the optical pulse propagating in the lower branch.

Figure 9:
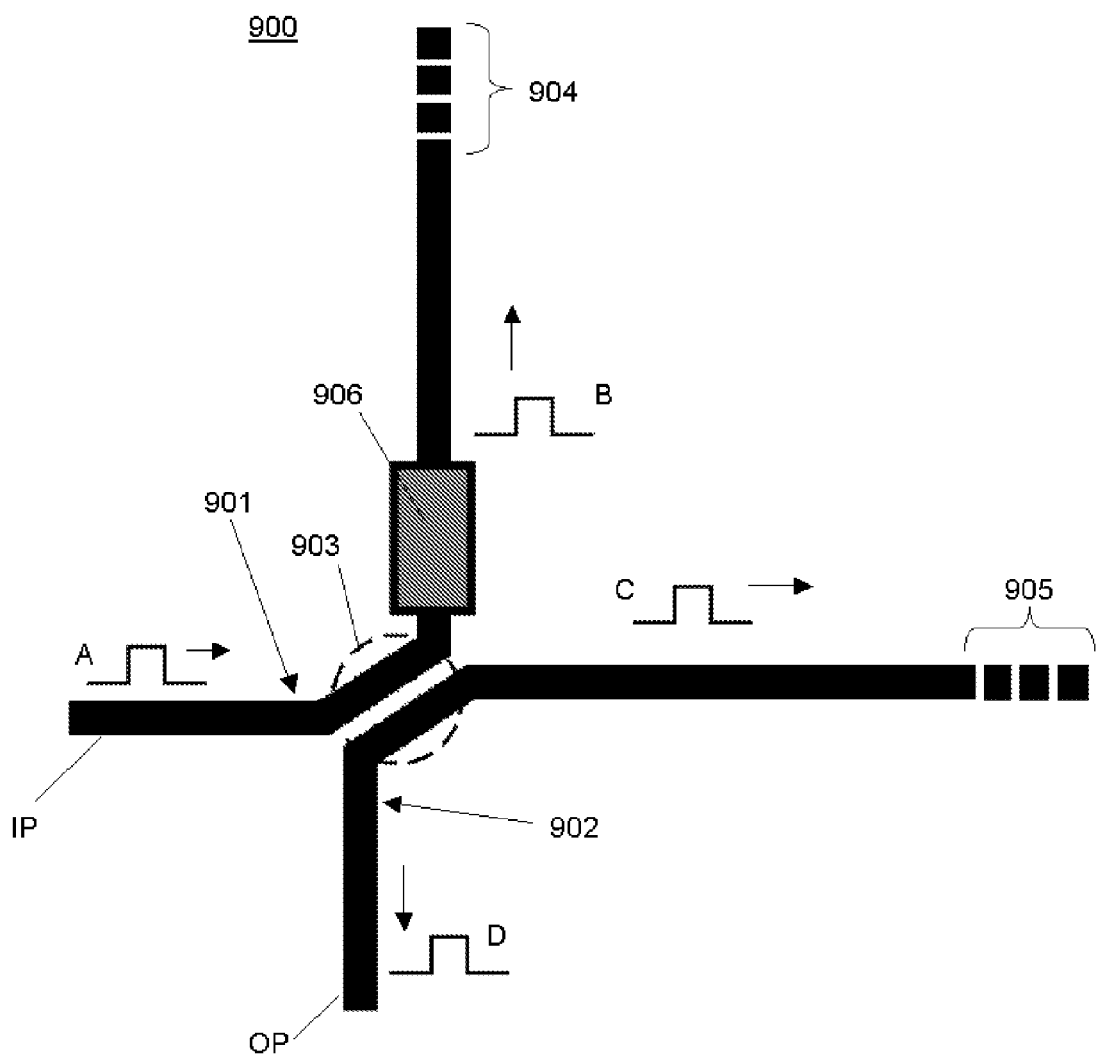

In some other embodiments, the interferometric element can be implemented as a Michelson interferometer. By way of example, FIG. 9 schematically depicts an interferometric element 900 according to an exemplary implementation of such an embodiment that includes two waveguide branches 901 and 902. The branch 901 includes an input port IP for receiving an input optical signal A and the branch 902 includes an output port OP through which an output signal D can exit the interferometric element. The waveguide branches 901 and 902 are optically coupled, e.g., via evanescent coupling, to one another in a coupling region 903 such that a portion of an input signal optical A is coupled to the branch 901 to propagate along that branch as an optical signal B with the remaining portion of the input signal propagating along the branch 902 as optical signal C. Both branches include reflective elements at their distal ends, such as Bragg gratings or mirrors 904 and 905, that cause the optical signals B and C to retro-reflect and propagate back towards the coupling region 903. At least a portion of the reflected optical signal propagating along the branch 901 is optically coupled within the coupling region 903 to the reflected optical signal C propagating along the branch 902 to form an output signal D.

In many implementations, the waveguide branches 901 and 902 have a width less than about 1 micron, or less than about 500 nm or less than about 200 nm, or less than about 100 nm, and are preferably formed of a material that exhibits a high degree of nonlinearity, e.g., a material whose refractive index exhibits a large nonlinear coefficient. In many implementations, the interferometer element is configured to impart an asymmetry to non-linear phase accumulated by signals B and C propagating, respectively, along the branches 901 and 902.

By way of example, the coupling region can be configured such that the coupling coefficient between the two branches is different than ½ such that the intensity of optical pulses B and C would differ, thus leading to a desired degree of asymmetry. In other cases, asymmetry between the two branches can be achieved by employing loss, gain and/or dispersive mechanisms, such as those discussed in connection with the previous embodiments. For example, in this implementation, a loss mechanism 906 can be placed in the branch 901 to generate an asymmetry with regard to nonlinear phase accumulated by the signal B propagating in that branch relative to the signal C that propagates in the other branch.

Figure 10:
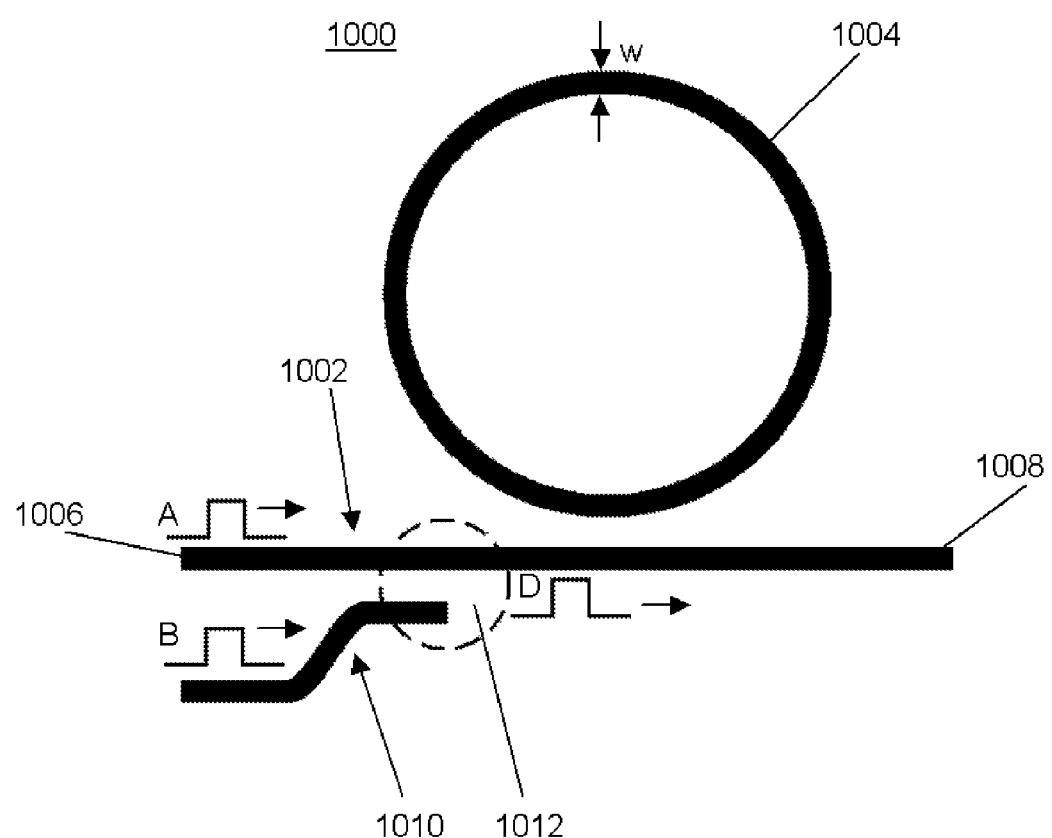

In some embodiments, rather than utilizing an interferometric loop, an optical resonator can be employed. By way of example, FIG. 10 schematically depicts an optical device 1000 according to an embodiment of the invention that can provide a NAND logic functionality. The device 1000 includes a waveguide 1002 that is evanescently coupled to a ring resonator 1004. The waveguide 1002 includes an input port 1006 for receiving a signal, such as signal A, as well as an output port 1008. Another waveguide 1010 is evanescently coupled to the waveguide 1002 within a coupling region 1012. The resonances, or supported modes, of the ring resonator correspond to those wavelengths that accumulate a total phase of 2 πm around the ring, where m is an integer. These resonances have a finite width related to the Quality factor (or Q factor) of the ring. In this implementation, the ring 1004 is formed as a loop waveguide from a nonlinear material, e.g., $TiO_2$, and has a width W less than about 1 micron, e.g., in range of about 100 nanometers to about 500 nanometers. As a result of the nonlinearity of the material forming the ring, the phase accumulated by a signal propagating around the ring depends on the intensity of the signal. Hence, the spectral location of ring resonances will be intensity dependent. In other words, the ring resonances can shift as a function of the intensity of an applied signal.

In this implementation of a NAND gate, the signals A and B applied to the waveguides can be coupled to form a signal resultant D. The intensities of the signals A and B and the resonance modes of the ring 1004 are selected such that the signal D will at least partially couple to the ring via resonance if either signal A or signal B is present. However, when signals A and B are both present, their combined signal D, or at least a substantial portion thereof, will couple into the ring, shifting its resonance such that a larger portion of the signal would enter the ring (similar to positive feedback) and consequently little signal passes to the output port 1008. As a result, either no signal will be present at the output port, or a signal present at the output will have a peak intensity below a selected threshold. However, if only one of the signals A or B is present, that signal will be insufficient to substantially change the resonance of the ring, due to its lower intensity, and hence will mostly pass to the output port 1008 to provide an output signal whose peak intensity is above a certain threshold. In this manner, a NAND logic functionality can be achieved. These principles can also be employed to achieve other logic functionalities, such as, OR, AND or XOR, either directly or by incorporating multiple logic elements (e.g., a NAND gate is a "universal logic gate" such that all other logic gates can be formed out of one or many NAND gates). In some implementations, the waveguides are also nano-sized and are formed, e.g., of $TiO_2$ or other suitable materials such as those listed herein.

In some embodiments of the above optical device, rather than utilizing two waveguides for receiving the input signals, one waveguide can be sufficient for receiving one or more input signals (e.g., logic and/or control signals) to provide a desired logic functionality. For example, in some cases a single logic input and a single waveguide can be employed, e.g., together with an appropriate control signal, to provide a NOT logic functionality.

Figure 11:
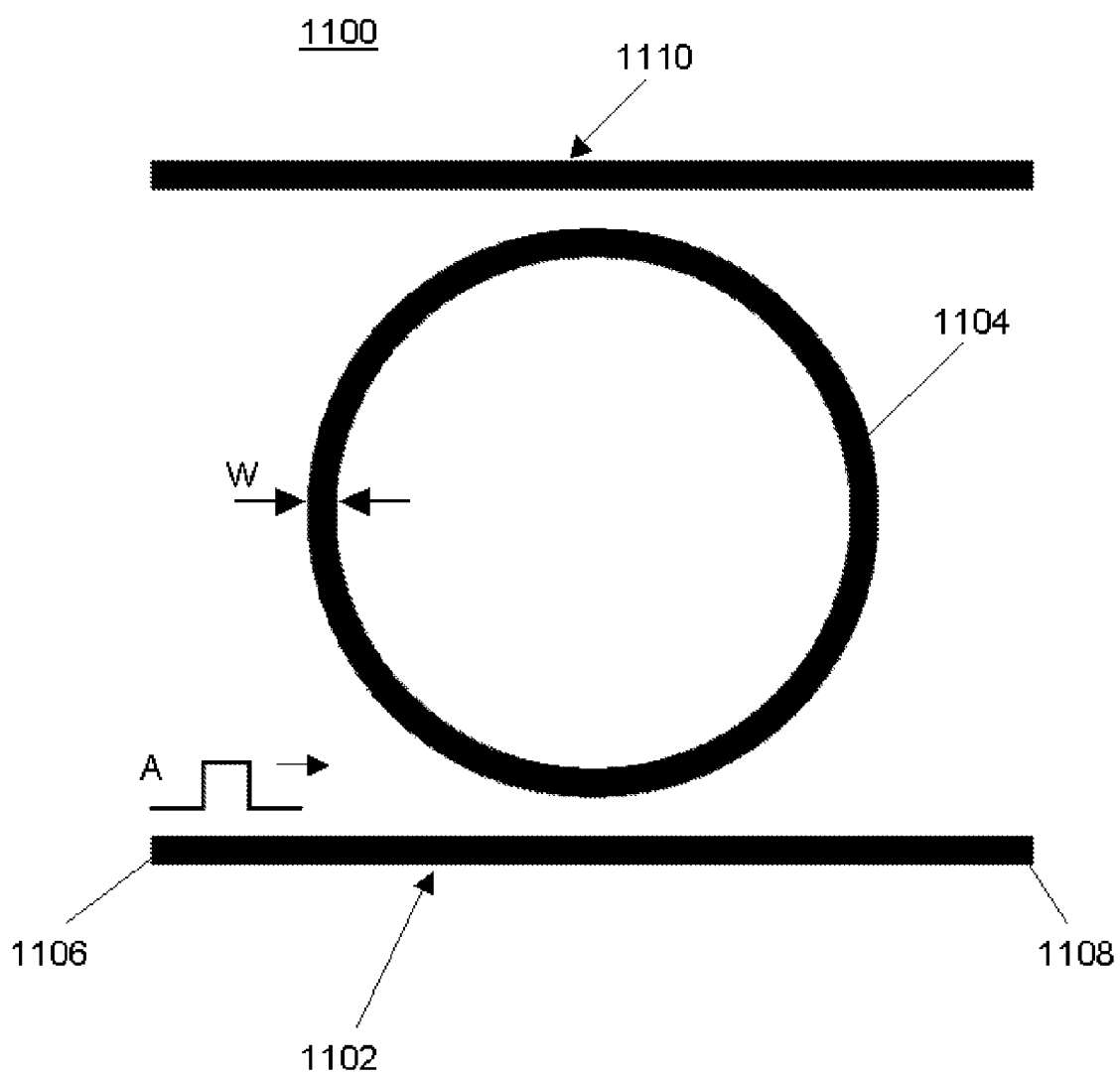

In some other embodiments, an all-optical switch is disclosed that employs an optical resonator. By way of example, FIG. 11 schematically depicts such an optical switch 1100 that includes a ring resonator 1104 evanescently coupled to a waveguide 1102 having an input port 1106 for receiving a signal, such as signal A, as well as an output port 1108. Another waveguide 1110 is also evanescently coupled to the ring resonator to provide an optical propagation path for a control signal, which can be continuous-wave or pulsed. Similar to the previous embodiment, the ring resonator is formed of a nonlinear material, e.g., $TiO_2$, and in many implementations has a width W that is less than about 1 micron, e.g., in a range of about 100 nm to about 500 nm. Further, in many implementations, the waveguides 1102 and 1110, e.g., also formed of $TiO_2$, are nano-sized waveguides. The control signal is partially or completely coupled into the ring via the waveguide 1110. The wavelength of the control radiation is preferably chosen to be different than the wavelength of the signal A, and the coupling regions are preferably designed for the different wavelengths of the signal and control radiation such that the control radiation does not couple out of the coupling region between the ring and the waveguide 1102. In some cases, the wavelengths of the control radiation and that of the signal A are well separated, e.g., by a value equal to or more than about 500 nm. For example, the signal A can have a central wavelength of about 1000 nm while the wavelength of the control radiation can be about 500 nm.

Figure 12A:
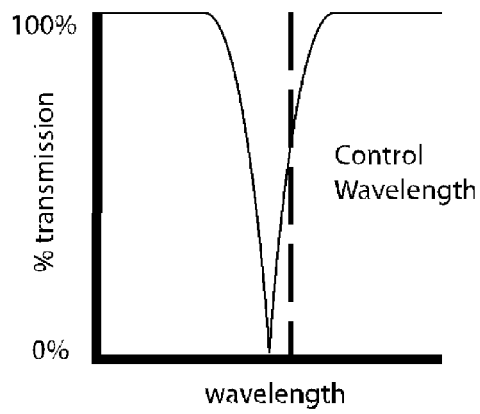
Figure 12B:
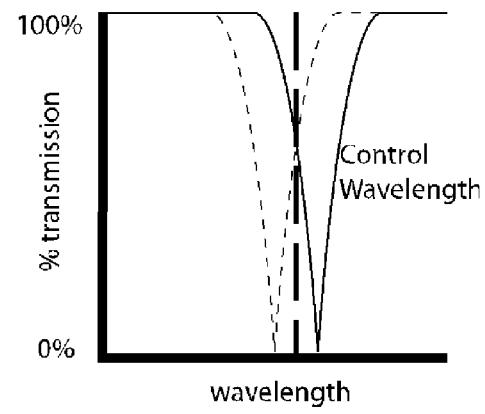
Figure 12C:
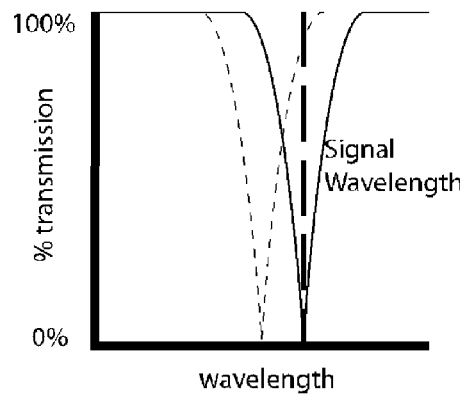
Figure 12D:
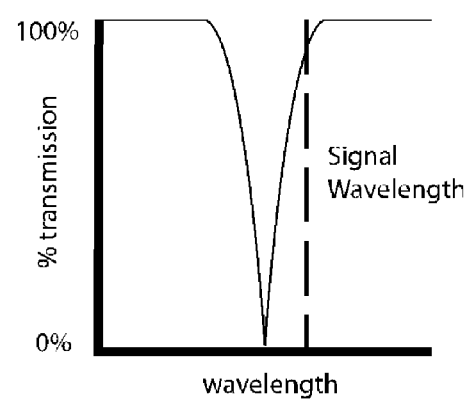

In use, when the control radiation (herein also referred to as control signal) is on, the control signal is coupled to the ring as shown schematically in FIG. 12A, thereby causing a resonance shift in the ring, as shown schematically in FIG. 12B. Notwithstanding the resonance shift, the control signal remains coupled to the ring. The resonance shift will result in strong coupling of the signal A to the ring by causing the signal A to be substantially in resonance with at least one resonant mode of the ring, as shown schematically in FIG. 12C, and hence does not pass, or only a small portion of it passes, to the output port 1108. In other words, the switch is turned off. In contrast, when the control signal is off, the signal A is off-resonance relative to the resonance modes of the ring, as shown schematically in FIG. 12D, and hence passes to the output port 1108. In other words, the switch is on. Alternatively, in some implementations, a control signal can be applied to turn the switch on, e.g., by shifting the ring resonance so as to lower the coupling of the signal A to the ring.

In the above all-optical switch, the control signal and the input signal A may excite different resonant modes of the ring. For example, the control signal may excite the mode corresponding to m=2 while the input signal A excites the mode corresponding to m=1. The control signal and signal A may also utilize the same mode.

While in the above optical switch 1100 two waveguides are employed, one for input signal A and the other for the control signal, in other implementation a single waveguide can employed for providing a propagation path, as well as coupling to the resonator, for both the input signal A and the control signal. In some cases where only a single waveguide is employed, a timing mechanism can be utilized for temporally adjusting the coupling of the input signal and/or the control signal to the optical resonator.

Figure 13:
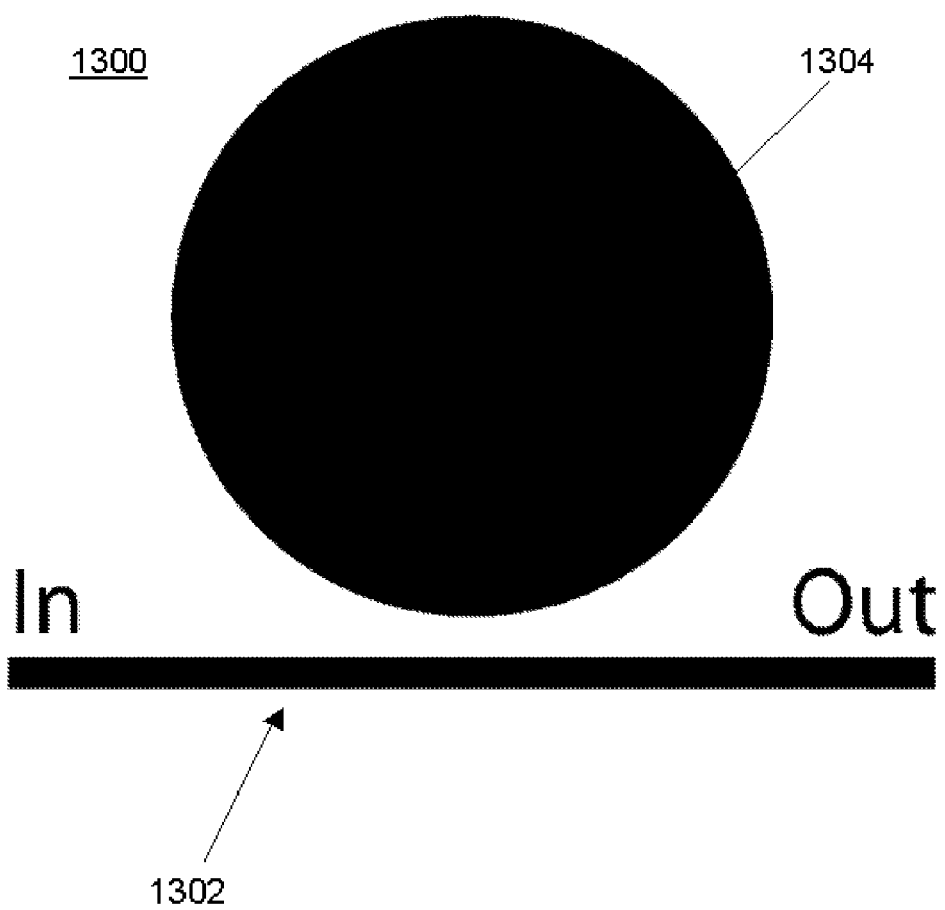

In some implementations, rather than employing an optical ring resonator, an optical disk resonator can be employed. For example, in the above devices 1000 and 1100, the ring resonator can be replaced with a disk resonator. Such an optical disk resonator is schematically shown in FIG. 13, which includes a waveguide 1302 that is evanescently coupled to a disk resonator 1304. The resonant modes supported by a disk resonator, which are often referred to as whispering gallery modes, have different spatial distributions than those of the ring resonator. Such spatial distributions should be taken into account in designing the coupling regions so the signals would couple to desired mode(s) (e.g., the control signal and signal A should have a sufficient spatial overlap so that the control signal would sufficiently change the index for the mode used by signal A).

In another aspect, the invention provides optical devices in which a control optical pulse is utilized to cause an optical signal that is optically coupled to the control pulse, e.g., in a nano-sized waveguide, to accumulate nonlinear phase via cross phase modulation. The optical signal can then be coupled to another signal that has undergone little or no cross phase modulation to generate an output signal via interference. By way of example, such an optical device can be an optical multiplexer or demultiplexer.

Figure 14:
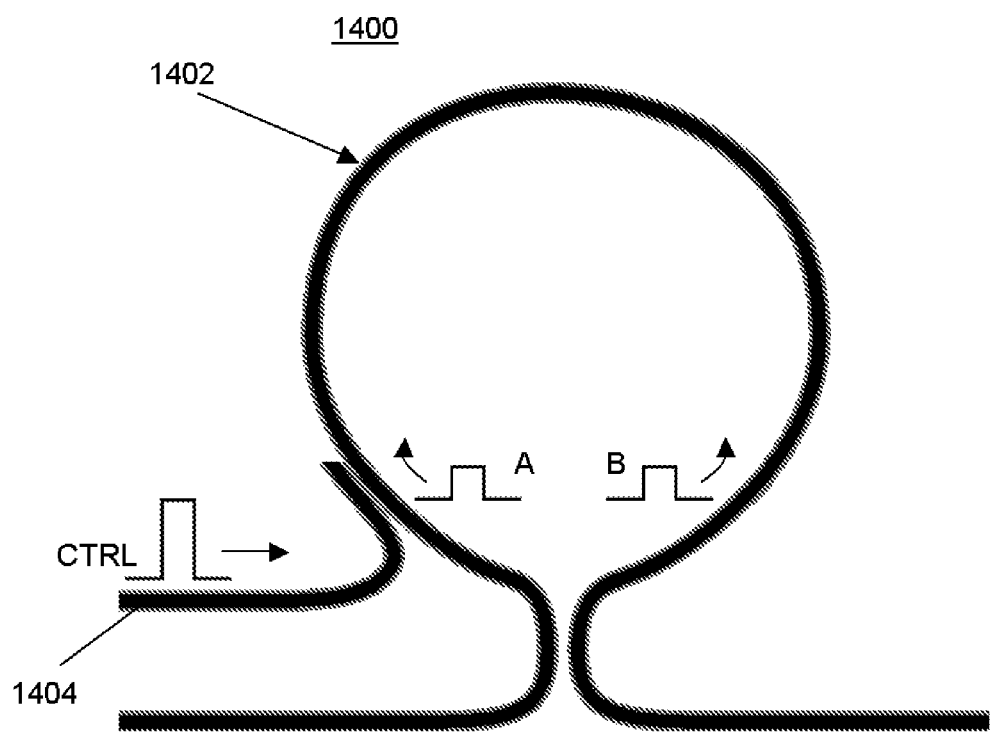

FIG. 14 schematically illustrates one embodiment of a device that can utilize cross phase modulation. As shown, the device 1400 is generally in the form of a Sagnac interferometer and can include a waveguide coupler 1404 coupled to a loop 1402 and configured to couple a control signal CTRL to an optical signal A traversing the loop 1402 in a clockwise direction. A timing mechanism (not shown) can be configured to apply the control signal CTRL and the optical signal A to the device 1400 in a synchronized manner such that the signals CTRL, A overlap over at least a portion of the loop 1402. Typically, the CTRL signal has a higher intensity than the signal A and causes the signal A to accumulate nonlinear phase via cross phase modulation. In contrast, a counter-propagating pulse B will not overlap the CTRL signal over any appreciable length of the loop. Here, both pulses A and B have a sufficiently low intensity such that self phase modulation produces negligible nonlinear phase in comparison to the cross phase modulation provided by the CTRL signal.

Devices such as those discussed above can be used to form optical time division multiplexers and/or demultiplexers. This can be achieved using a series of optical switches or optical AND gates in conjunction with control pulses or additional control signals to multiplex a plurality of signals.

Figure 15A:
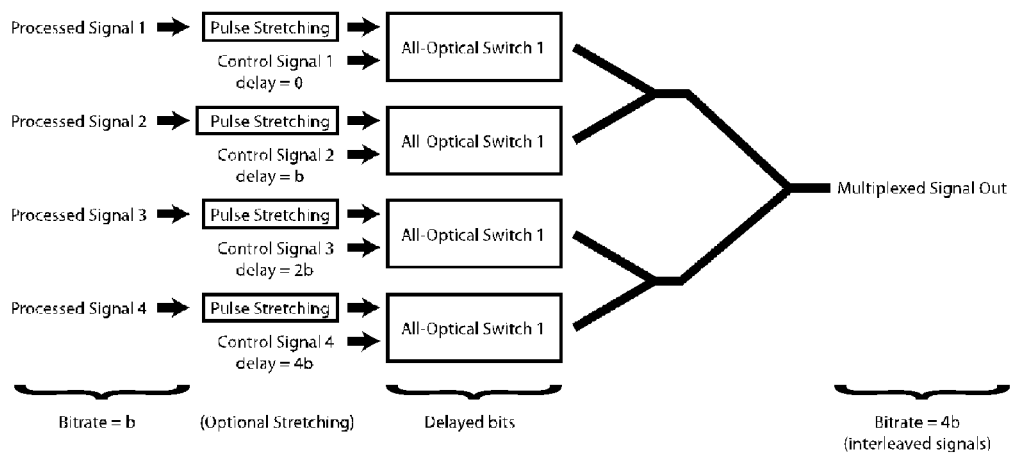
FIG. 15B is a timing diagram of the multiplexing of four input signals into a single output signal using the multiplexer of FIG. 15A, FIG. 15C schematically illustrates an example of an output of a Sagnac interferometer according to one embodiment of the invention, FIG. 15D schematically depicts an optical switch 1:4 demultiplexer according to one embodiment of the invention.
Figure 15B:
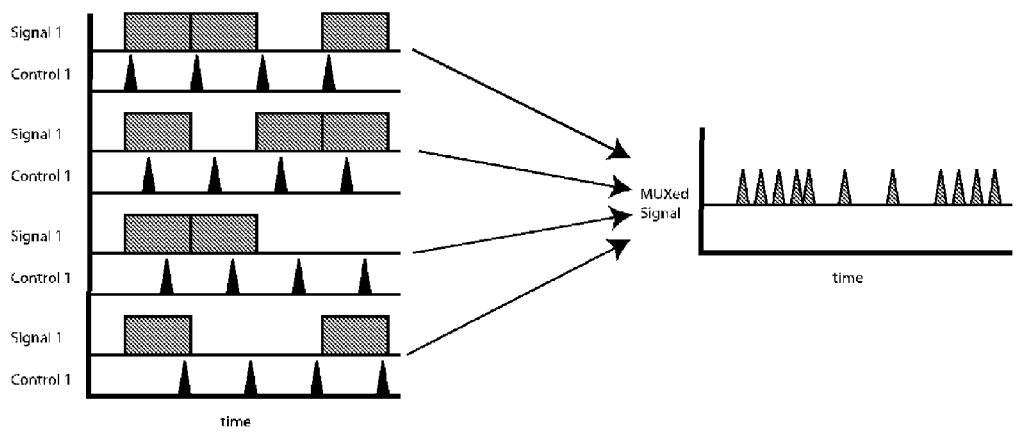

FIG. 15A schematically shows one embodiment of a 4:1 multiplexer that includes a series of all-optical switches in accordance with the teachings of the invention. As shown, four input signals (Processed Signal 1-4) can be time division multiplexed into a single output signal (Multiplexed Signal Out) using four control signals (Control Signals 1-4). As shown in FIG. 15A and the timing diagram of FIG. 15B, the input signal pulses representing one or more bits can first be stretched to reasonably long durations. If four signals are to be combined, each having a bit rate of 10 GHz, the output bit rate (multiplexed) would have a bit rate of 40 GHz. Therefore, each pulse can be stretched to 100 ps. This can be achieved using dispersive optics such as dispersive waveguides (as described herein) or using spectral filtering to reduce the bandwidth and produce a longer pulse duration. During this 100 ps, four bits can pass through four switches (or AND gates) and four control pulses (having durations less than 25 ps) can be sent to each of the switches such that the first bit's switch is opened in the first 25 ps, the second bit's switch is opened between 25-50 ps, the third from 50-75 ps and the fourth from 75-100 ps. This can be performed repeatedly so as to interleave the signals resulting in a 40 GHz bit stream. The all-optical switches of the illustrated multiplexer can be of several types. For example, they can be in the form of the optical switch shown in FIG. 11. Alternatively, or in addition, the switches can include a Sagnac interferometer having two inputs such that the control signal is much larger than the data signal using the logical scheme represented in FIG. 15C and discussed in more detail below.

Figure 15C:
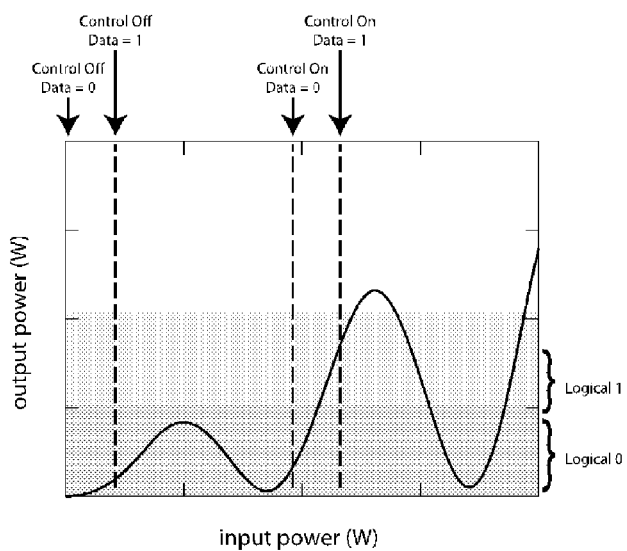

FIG. 15C represents a typical output of a Sagnac interferometer in which the asymmetry is a result of the coupling ratio, here 60-40. The switch can be designed such that the control pulse has a higher intensity than the data pulse. With the control signal "off", the output is limited to low output powers, which are represented by logical 0s. With the control signal "on", the output is either a logical 1 or a logical 0, depending on whether the data is a logical 1 or a logical 0. In this case, both the control and data signals can be the same wavelength. Using such a scheme, the timing of data pulses can be adjusted by temporally stretching the data pulses and switching these on or off using a shorter control pulse. The timing could therefore be adjusted by changing the delay of the control pulse.

Figure 15D:
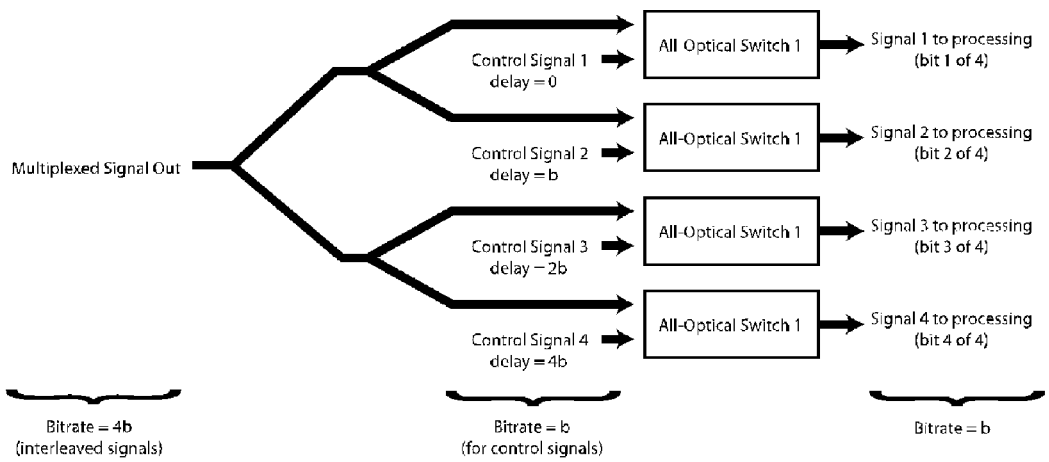

Optical switches can also be used to construct a demultiplexer. Demultiplexing effectively take signals that are interleaved and separates them out into individual data streams. This can be accomplished by using a series of optical switches as shown in FIG. 15D. First, the multiplexed signal (Multiplexed Signal Out) is split into multiple copies. Before or during this process, the signal may be amplified using methods known in the art to make up for the losses that are incurred during the splitting. Each of the copies can then be applied to an all-optical switch which is controlled by several synchronous control pulses (Control Signal 1-4). Each control pulse has a bit-rate that is the bit rate of the multiplexed signal divided by the number of multiplexed signals. Here, for example, there are 4 multiplexed signals (channels) so the input bit rate is 4 times the bit rate of one channel (b). Consequently, the control signals are at a bit rate b and are timed such that Control Signal 1 enters all-Optical Switch 1 when the first bit arrives creating an output signal (Signal 1 to processing). Similarly, Control Signal 2 enters All-Optical Switch 2 when the second bit arrives and so on to parse out the individual signals and put each on a separate line. Additional signal conditioning may be necessary (for example, using the retiming scheme described herein), depending on additional processing requirements.

As discussed above, in some embodiment of the above devices, $TiO_2$ is employed of fabricating various optical elements, such as interferometric waveguides, resonators, and other waveguides. The use of $TiO_2$ provides certain advantages. For example, it allows the optical elements to be substantially transparent to radiation in a range of about 400 nm to about 1 micron, e.g., in a range of about 400 nm to about 850 nm. Further, the high degree of nonlinearity exhibited by $TiO_2$ facilitates the operation of such devices. Further, such devices are advantageously compatible with Ti:Sapphire lasers. For example, Ti:Sapphire lasers can be employed to generate optical pulses (e.g., at a wavelength of 800 nm in some cases) that can be applied to such devices as signals, e.g., input signals.

In some such implementations, the above $TiO_2$ optical structures can be fabricated on an underlying silica-coated silicon substrate (in some cases the thickness of the silica coating can be, e.g., in a range of about 1 micron to about 5 microns, which can be either grown, e.g., using a wet oxidation process, or by using physical or vapor deposition).

Figure 16:
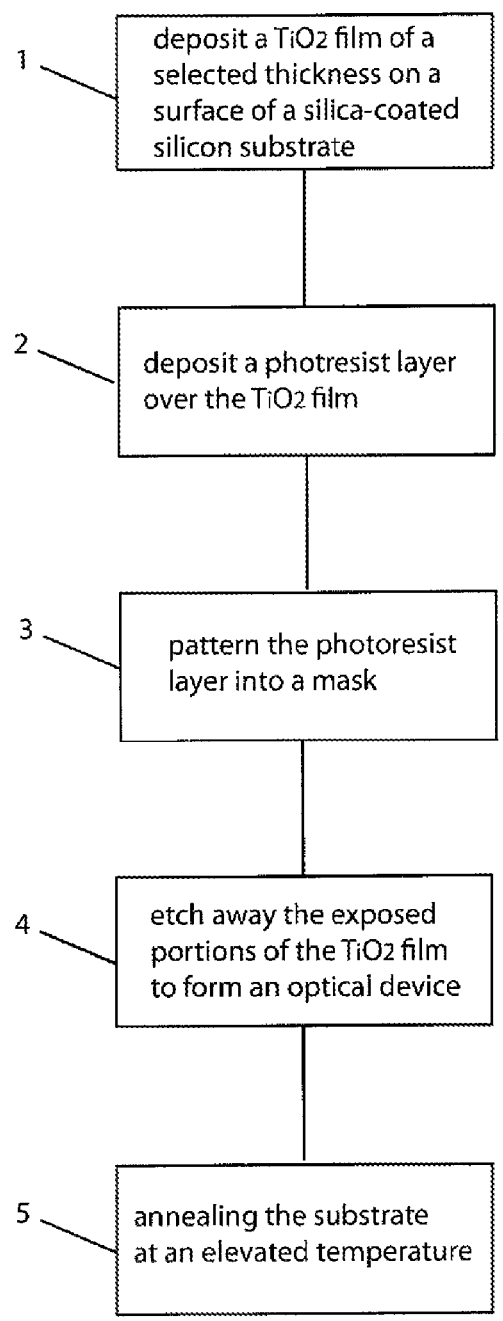
FIG. 16 is a flow chart illustrating various steps in an exemplary method for generating an optical device according to the teachings of the invention, FIG. 17A schematically depicts a TiO$_2$ film disposed on substrate, FIG. 17B schematically depicts a photoresist layer deposited on the TiO$_2$ film shown in FIG. 12A, FIG. 17C schematically depicts a patterned mask generated by exposing selective portions of the photoresist layer of FIG. 17B to radiation and developing the photoresist, and FIG. 18 schematically depicts a network router employing optical switches and logic circuits in accordance with the teachings of the invention.
Figure 17A:
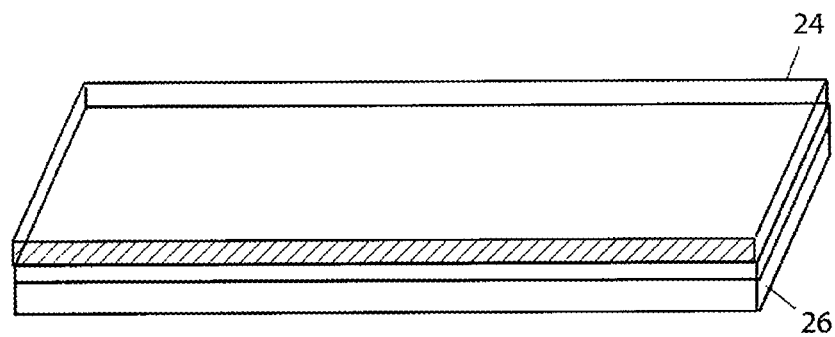

For example, with reference to flow chart of FIG. 16 as well as FIG. 17A, initially, a film of $TiO_2$ 24 having a desired thickness can be deposited on a surface of a silica-coated silicon substrate 26 (step 1). In some cases, the thickness of the $TiO_2$ film can be in a range of about 50 nm to about 5 microns, e.g., in a range of about 50 nm to about 800 nm. A variety of techniques can be employed to deposit the $TiO_2$ such as DC and RF magnetron sputtering, atomic layer deposition, ion assisted deposition, e-beam evaporation, sol-gel techniques, and chemical vapor deposition. In some cases, a combination of these methods can be employed. A thin layer of $TiO_2$ (or another material that is closely lattice matched) having a desired crystal structure can be formed via a relatively slow and/or well controlled deposition method. This thin layer can then be employed as a seed layer for addition deposition to ensure that the resultant film would have a controlled crystal structure and crystal orientation.

Figure 17B:
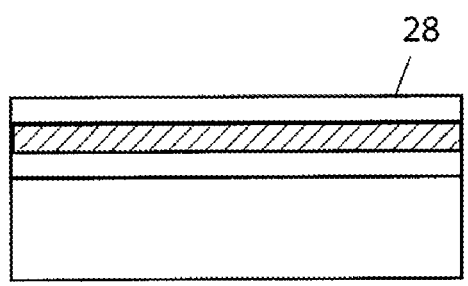
Figure 17C:
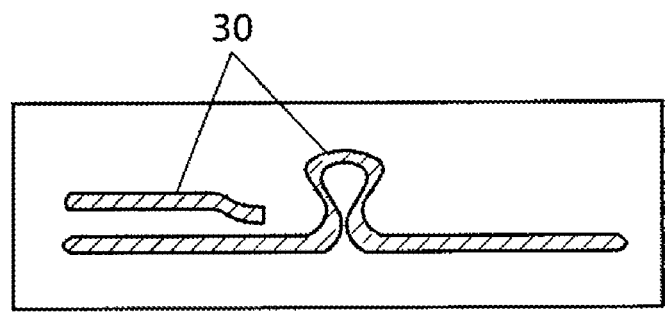

Subsequently, a photoresist layer 28 can be deposited over the $TiO_2$ film (step 2), as shown schematically in FIG. 17B. The photoresist layer can be patterned into a mask (step 3) for covering selected portions of the underlying $TiO_2$ film via irradiation of selected portions thereof and its subsequent development. In some embodiments, a negative photoresist, such as a photoresist marketed by MicroChem Corporation of Massachusetts, U.S.A. under trade designation SU82002, can be employed. The exposure of selected portions of such a negative photoresist to radiation having suitable wavelength(s) can render those portions relatively insoluble to a developer, such as SU8 developer, while the non-irradiated portions of the photoresist can remain soluble in the developer. Subsequently, the non-irradiated portions can be dissolved by the developer to leave the irradiated portions covering selected areas of the underlying $TiO_2$ film. The patterning of the mask is done such that those areas of the $TiO_2$ film not covered by the patterned mask are to be removed and the remaining areas correspond to various nanostructures forming the above optical device 10. FIG. 17C shows schematically such a patterned mask 30.

Alternatively, a positive photoresist can be employed for generating a patterned mask over the underlying TiO$_2$ film. For example, a positive photoresist marketed by Shipley Corporation of Massachusetts, U.S.A. under the trade designation S1805 can be utilized and patterned via suitable radiation and a suitable developer, e.g., MF-319 developer. In other cases, a positive photoresist can be employed for fabricating some portions of a device and a negative photoresist for fabricating other portions of that device.

Subsequently, the exposed portion of the TiO$_2$ film (that is, those portions that are not protected by cured photoresist) can be etched away (e.g., by employing induction coupled plasma reactive ion etching or wet etching) to leave behind the TiO$_2$ nanostructures forming the device 10 (step 4). Some suitable reactive ion etching chemistries include, without limitation, SF$_6$/Ar and Cl$_2$/Ar. Some suitable wet etching chemistries include H$_2$SO$_4$, HCl/HNO$_3$, HF/NH$_4$F and HF/HNO$_3$.

In some embodiments, subsequent to the etching step, an annealing step (4) can be optionally employed in which the silicon-coated substrate, e.g., with devices, is subjected to a high temperature, e.g., a temperature in a range of about 1500° C. to about 2000° C., for a selected duration, e.g., in a range of about 10 seconds to about 10 minutes, to melt and resolidify the exposed portions of the substrate to smooth out surface roughness that may have resulted during the etching step. In some cases, such annealing can be performed by applying a plurality of radiation pulses (e.g., laser pulses) to the surface. For example, in some cases, the annealing step can be performed by employing laser radiation pulses having a duration of about 10 ns and a center wavelength of about 10.6 micrometers. Alternatively, other wet processes, such as Piranha etch, may be employed to reduce surface roughness.

Although in many cases, optical devices according to the teachings of the invention, such as all-optical logic gates, formed from TiO$_2$ can provide a number of advantages, e.g., CMOS compatibility and large refractive index as well as intrinsic non-linearity, the teachings of the invention are not limited to logic gates formed of TiO$_2$. In general, the materials suitable for generating optical devices according to the teachings of the invention exhibit a large $\chi^{(3)}$ nonlinearity, e.g., a $\chi^{(3)}$ greater than about $10^{-14}$ cm$^2$/W with low two photon absorption, e.g., a two photon absorption less than about $10^{-10}$ cm/W, a high linear index (e.g., greater than abut 1.6 and preferably greater than about 2) as well as transparency at usable wavelengths (e.g., over a wavelength range of about 400 nm to about 2 microns, and in some cases in a range of about 800 nm to about 1550 nm, e.g., in a range of about 400 nm to about 1 micron). For example, the above device 10 can be fabricated by utilizing a variety of semiconductor materials, such as CdS or ZnSe, among others. Other examples of suitable materials include CuCl, SiC, GaP, SrTiO$_3$, and ZnTe.

The optical devices according to the teachings of the invention find a variety of applications. For example, they can be utilized for all-optical network routing. In many existing networks, a routing hub can receive optical signals via fiber optic cables. These optical signals are converted to electrical signals (OE), e.g., by utilizing ingress line cards. The received information (packet) is processed, parsing out header/routing information. The routing information that accompanies the received data is read and sent to a switch control. The switch control can operate a switching network (crossbar switch), which reroutes the information to specific egress cards. The egress cards compile the information packets (potentially with additional header/routing information) and then convert the electrical signals to optical signals (EO). These optical signals are then propagated to the optical network. Many of the hubs are linked together to enable rerouting of information throughout the network.

Figure 18:
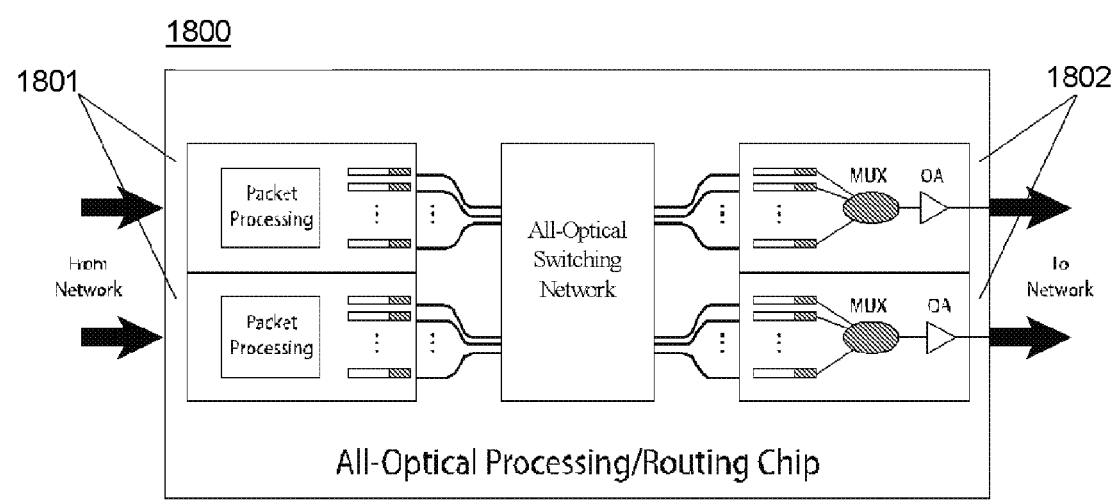

The optical devices of the invention allow many of logic and switching operations that are currently performed electrically by many of the components, such as the ingress cards, switching controller, switching network and egress cards, to be performed in the optical domain. By way of example, FIG. 18 schematically depicts an optical routing hub 1800 that includes optical packet processing performed in its ingress cards 1801 and egress cards 1802. The exemplary hub 1700 also includes an all-optical switching network. In some implementations, the entire system could be fabricated on a single, highly integrated chip including such elements as optical multiplexers (MUX) and optical amplifiers (OA).

The following examples are provided to further elucidate some aspects of methods of fabricating optical devices discussed above. This example is provided only for illustrative purposes. For example, the minimum measured waveguiding loss reported for a TiO$_2$ film in the following example is not intended to be a lower bound.

EXAMPLES

The following examples illustrate the feasibility of fabricating TiO$_2$ films, which can be employed via subsequent processing steps, to fabricate optical devices according to the teachings of the invention.

Example I

TiO$_2$ films on a 2.2 micron silica coated silicon substrate were generated via electron beam evaporation of 99% pure TiO$_2$ (3 mm×6 mm pieces) by employing e-beam currents in a range of about 50 mA to about 100 mA at a deposition rate in a range of about 0.01 nm/s to about 0.1 nm/s. An Edwards Auto 306 electron beam evaporator, manufactured by BOC Edwards of West Sussex, UK, was employed for e-beam evaporation.

Planar waveguiding was observed in films having thicknesses from about 100 nm to about 450 nm using a prism coupler. Specifically, waveguiding in films of the following thicknesses have been observed: 136 nm, 137 nm, 154 nm, 163 nm, 216 nm, 286 nm, and 435 nm. Planar guiding losses were measured to be as low as 1 dB/cm at a propagating radiation wavelength of 826 nm for the 216 nm film.

The measured index of refraction for these e-beam deposited TiO$_2$ films were typically about 2.1 at a radiation wavelength of 826 nm. The index of refraction was determined by employing prism coupling and variable angle spectroscopic ellipsometry.

Example II

Reactive sputtering using a Ti target and O$_2$ was employed to fabricate TiO$_2$ films. A sputtering system manufactured by AJA International, Inc. of Massachusetts U.S.A. under the trade designation ATC 2200 was utilized for generating the films. Roughly 40 films ranging in thickness from about 50 nm to about 300 nm were fabricated. The waveguiding losses lower than about 5 db/cm were observed at a radiation wavelength of 826 nm using a 80 nm film. The measured indices of refraction were as high as 2.4.

Those having ordinary skill in the art will appreciate that various modifications can be made to the above embodiments without departing from the scope of the invention. For example, although the above exemplary embodiments pertaining to all-optical logic gates provide NAND logic functionality, the teachings of the invention can be utilized to provide other logic functionalities, e.g., AND, OR, XOR, NOR, XNOR, or NOT gates.

The invention claimed is:

1. An optical device, comprising
one or more input ports for receiving one or more input optical signals, an interferometric component in optical coupling with at least one of said input ports to receive at least one signal based on said input signals and to generate at least two intermediate signals from said at least one received signal, said interferometric component having one or more nano-sized waveguides formed of a material exhibiting nonlinearity for providing propagation paths for said at least two intermediate signals such that said intermediate signals accumulate phase asymmetrically upon propagation through said one or more nano-sized waveguides,
said interferometric component being configured to generate an output signal based on interference of said intermediate signals subsequent to their asymmetric phase accumulation, and
an output port in optical coupling with said interferometer to receive said output signal,
an optical gain mechanism coupled to at least one of said one or more nano-sized waveguides for providing an optical gain profile exhibiting an asymmetric optical gain for at least one wavelength corresponding to a wavelength of at least one of said derived signals,
wherein said optical gain mechanism comprises:
a gain medium disposed in said at least one nano-sized waveguide, and
an optical source for generating a pump radiation, said optical source being optically coupled to a portion of said at least one waveguide to deliver said pump radiation to the gain medium, said optical pulse having a wavelength suitable for absorption by said gain medium,
wherein said gain medium is uniformly distributed along said loop.

2. The optical device of claim 1, wherein said pump pulse asymmetrically excites said gain medium as it propagates along the loop.

3. An optical device, comprising:
one or more input ports for receiving one or more input optical signals, an interferometric component in optical coupling with at least one of said input ports to receive at least one signal based on said input signals and to generate at least two intermediate signals from said at least one received signal, said interferometric component having one or more nano-sized waveguides formed of a material exhibiting nonlinearity for providing propagation paths for said at least two intermediate signals such that said intermediate signals accumulate phase asymmetrically upon propagation through said one or more nano-sized waveguides,
said interferometric component being configured to generate an output signal based on interference of said intermediate signals subsequent to their asymmetric phase accumulation, and
an output port in optical coupling with said interferometer to receive said output signal,
wherein said one or more nano-sized waveguides are substantially transparent to radiation wavelengths in a range of about 400 nm to about 1000 nm.

4. The optical device of claim 3, wherein said one or more nano-sized waveguides are substantially transparent to radiation having wavelengths in a range of about 800 nm to about 1550 nm.

5. The optical device of claim 3, further comprising optical gain mechanism coupled to at least one of said one or more nano-sized waveguides for providing an optical gain profile exhibiting an asymmetric optical gain for at least one wavelength corresponding to a wavelength of at least one of said derived signals.

6. The optical device of claim 5, wherein said optical gain mechanism comprises:
a gain medium disposed in said at least one nano-sized waveguide, and
an optical source for generating a pump radiation, said optical source being optically coupled to a portion of said at least one waveguide to deliver said pump radiation to the gain medium, said optical pulse having a wavelength suitable for absorption by said gain medium.

7. The optical device of claim 3, wherein said one or more nano-sized waveguides are formed of a material exhibiting a third order nonlinear susceptibility ($\chi^3$) greater than about $10^{-14}$ cm$^2$/W.

8. The optical device of claim 3, wherein said one or more nano-sized waveguides is formed of TiO$_2$.

9. The optical device of claim 3, wherein said interferometric component has a Sagnac configuration and said one or more nano-sized waveguides comprise a waveguide loop.

10. The optical device of claim 9, wherein said waveguide loop has an input port and an output port, said input and output ports of the loop being evanescently coupled to split said at least one received signal into a CW propagating signal and a CCW propagating signal corresponding to said intermediate signals.

11. The optical device of claim 10, wherein at least one of said counter-propagating signals accumulates phase non-linearly as a result of self phase modulation.

12. The optical device of claim 10, wherein said evanescent coupling is characterized by a coupling coefficient less than about 0.5.

13. The optical device of claim 12, wherein said waveguide loop has a width in a range of about 100 nm to about 500 nm.

14. The optical device of claim 9, wherein said waveguide loop has a width less than about 500 nm.

15. The optical device of claim 9, wherein said evanescent coupling is characterized by a coupling coefficient in a range of about 0.3 to about 0.5.

16. The optical device of claim 3, wherein said interferometric component has a Mach-Zehnder interferometric configuration and said one or more nano-sized waveguides comprise two waveguide branches of said Mach-Zehnder interferometric configuration.

17. The optical device of claim 16, wherein said two waveguide branches are coupled at an input junction configured to split said at least one received signal into said at least two intermediate signals and are coupled at an output junction for combining said intermediate signal subsequent to their asymmetric phase accumulation to generate said output signal.

18. The optical device of claim 3, further comprising a semiconductor substrate on which said interferometric component is disposed.

19. The optical device of claim 18, further comprising an insulating layer separating said interferometer component from said substrate.

20. The optical device of claim 19, wherein said substrate comprises a silicon substrate and said insulating layer comprises a silicon oxide layer.

21. The optical device of claim 3, further comprising any of a loss, a gain, a dispersive mechanism or a control signal coupled to at least one of said one or more nano-sized waveguides so as to facilitate said asymmetric phase accumulation of said optical signals.

22. The optical device of claim 21, wherein said loss mechanism comprises a cladding layer disposed over a selected portion of said at least one of said one or more nano-sized waveguides.

23. The optical device of claim 21, wherein said loss mechanism comprises a light scattering mechanism.

24. The optical device of claim 3, wherein said interferometric component has a Michelson interferometric configuration and said one or more nano-sized waveguides comprise two branches of the Michelson configuration.

25. The optical device of claim 3, wherein said optical device comprises an optical logic circuit and wherein said one or more input optical signals represent one or more logic signals and said output signal represents a Boolean logic applied to said one or more input logic signals.

26. The optical device of claim 25, wherein at least one of said input logic signals comprises an optical pulse having a pulse width in a range of about 50 femtoseconds to about 1 picosecond.

27. The optical device of claim 25, wherein at least one of said input logic signals comprises an optical pulse having an energy in a range of about 1 pJ to about 10 nJ.

28. An optical circuit, comprising:
at least one input port for receiving one or more optical input signals and an output port,
an optical interferometer optically coupled to said at least one input port to receive an optical entry signal based on said one or more optical input signals and to generate at least two intermediate signals based on said entry signal, said interferometer having at least one nano-sized interferometric element configured to cause at least one of said intermediate signals to accumulate phase nonlinearly and to generate an output signal based on interference of said intermediate signals subsequent to said non-linear phase accumulation,
wherein said output signal exhibits a peak intensity that is a function of peak intensities of said input signals,
wherein said at least one nano-sized interferometric element comprises any of $TiO_2$, CdS, CuCl, SiC, GaP, $SrTiO_3$ and ZnTe.

29. The optical circuit of claim 28, wherein said interferometric element is formed of a material exhibiting a third order nonlinear susceptibility ($\chi^3$) greater than about $10^{-14}$ $cm^2/W$.

30. The optical circuit of claim 28, wherein said interferometer is configured such that said output signal exhibits a peak intensity greater than a predefined level when the peak intensity of at least one of said input signals exceeds a predefined threshold.

31. The optical circuit of claim 28, wherein said interferometer is configured such that said output signal exhibits a peak intensity less than a predefined level when the peak intensity of at least one of said input signals is less than a predefined threshold.

32. The optical circuit of claim 28, wherein said nano-sized interferometric element is substantially transparent to radiation having wavelengths in at least one of the following wavelength ranges: in a range of about 400 nm to about 1550 nm, in a range of about 400 nm to about 1000 nm, in a range of about 400 nm to about 850 nm, in a range of about 500 nm to about 1000 nm, and in a range of about 500 nm to about 850 nm.

33. The optical circuit of claim 28, wherein said interferometer is configured such that said output signal exhibits a peak intensity greater than a predefined threshold when the peak intensity of all of said input signals is less than a predefined threshold.

34. The optical circuit of claim 28, wherein said interferometer is configured such that said output signal exhibits a peak intensity greater than a predefined level when the peak intensities of all input signals exceed a predefined threshold.

35. The optical circuit of claim 28, wherein said interferometer is configured such that said output signal exhibits a peak intensity greater than a predefined level when the peak intensity of only one of said input signals exceeds a predefined threshold.

36. The optical circuit of claim 28, wherein said interferometer has any of a Sagnac, Mach-Zehnder or Michelson configuration.

* * * * *